United States Patent
Wu et al.

(10) Patent No.: US 11,233,756 B2
(45) Date of Patent: Jan. 25, 2022

(54) VOICE FORWARDING IN AUTOMATED CHATTING

(71) Applicant: Microsoft Technology Licensing, LLC, Redmond, WA (US)

(72) Inventors: Xianchao Wu, Tokyo (JP); Kazushige Ito, Kashiwa (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/492,414

(22) PCT Filed: Apr. 7, 2017

(86) PCT No.: PCT/CN2017/079698
§ 371 (c)(1),
(2) Date: Sep. 9, 2019

(87) PCT Pub. No.: WO2018/184199
PCT Pub. Date: Oct. 11, 2018

(65) Prior Publication Data
US 2020/0044999 A1     Feb. 6, 2020

(51) Int. Cl.
*H04L 12/58*     (2006.01)
*G06F 16/332*     (2019.01)
*G10L 25/63*     (2013.01)

(52) U.S. Cl.
CPC ........ *H04L 51/046* (2013.01); *G06F 16/3329* (2019.01); *G10L 25/63* (2013.01); *H04L 51/02* (2013.01); *H04L 51/32* (2013.01)

(58) Field of Classification Search
CPC ....... H04L 51/046; H04L 51/02; H04L 51/32; G06F 16/3329; G10L 25/63
(Continued)

(56) References Cited

U.S. PATENT DOCUMENTS 6,097,941 A    8/2000   Helferich
6,463,412 B1 *   10/2002   Baumgartner .......... G10L 15/26
                                                     704/246
(Continued)

FOREIGN PATENT DOCUMENTS

CN         1384445 A     12/2002
CN       101030368 A      9/2007
(Continued)

OTHER PUBLICATIONS

Stephen Smaldone, Lu Han, Pravin Shankar, and Liviu Iftode. 2008. RoadSpeak: enabling voice chat on roadways using vehicular social networks. Proceedings of the 1st Workshop on Social Network Systems (SocialNets '08). Association for Computing Machinery, New York, NY, USA, 43-48. (Year: 2008).*
(Continued)

*Primary Examiner* — Melvin H Pollack
(74) *Attorney, Agent, or Firm* — Schwegman Lundberg & Woessner, P.A.

(57) ABSTRACT

The present disclosure provides method and apparatus for voice forwarding in automated chatting. A first request for transmitting a voice segment may be received from a first entity in a service group. The voice segment may be received from the first entity. A voice message may be generated based on the voice segment. The voice message may be transmitted based on the first request.

20 Claims, 11 Drawing Sheets

(58) Field of Classification Search
USPC .................................................... 709/206
See application file for complete search history.

(56) References Cited

U.S. PATENT DOCUMENTS

| | | | |
|---|---|---|---|
| 7,440,900 B2 | 10/2008 | Chang | |
| 7,512,656 B2* | 3/2009 | Tsuchiya | A63F 13/12 |
| | | | 709/205 |
| 7,627,475 B2 | 12/2009 | Petrushin | |
| 7,769,364 B2* | 8/2010 | Logan | G08B 21/0238 |
| | | | 455/413 |
| 7,890,957 B2* | 2/2011 | Campbell | G06F 16/958 |
| | | | 719/313 |
| 8,060,565 B1* | 11/2011 | Swartz | G10L 13/00 |
| | | | 709/206 |
| 8,078,470 B2 | 12/2011 | Levanon et al. | |
| 8,170,196 B2* | 5/2012 | Knott | G06Q 10/0639 |
| | | | 379/265.02 |
| 8,230,343 B2* | 7/2012 | Logan | H04H 20/28 |
| | | | 715/723 |
| 8,238,526 B1* | 8/2012 | Seth | H04M 3/5335 |
| | | | 379/88.11 |
| 8,249,568 B2* | 8/2012 | Salmon | H04M 1/7255 |
| | | | 455/414.4 |
| 8,630,961 B2* | 1/2014 | Beilby | G06N 3/004 |
| | | | 706/11 |
| 8,634,411 B2* | 1/2014 | Athias | H04L 65/104 |
| | | | 370/352 |
| 8,706,827 B1* | 4/2014 | Noble | H04L 51/00 |
| | | | 709/206 |
| 8,917,860 B2* | 12/2014 | Duva | G06Q 30/0202 |
| | | | 379/265.09 |
| 9,203,966 B2* | 12/2015 | Moncomble | H04M 3/53366 |
| 9,225,837 B2 | 12/2015 | Boghjalian et al. | |
| 9,253,609 B2* | 2/2016 | Hosier, Jr. | G06F 3/04847 |
| 9,275,342 B2* | 3/2016 | Vijayaraghavan | G06N 5/04 |
| 9,286,906 B2* | 3/2016 | Bonada | G10L 21/013 |
| 9,325,624 B2* | 4/2016 | Malatack | H04L 47/125 |
| 9,361,652 B2* | 6/2016 | Su | G06F 40/14 |
| 9,380,017 B2* | 6/2016 | Gelfenbeyn | H04L 51/32 |
| 9,419,923 B2* | 8/2016 | Seo | H04L 12/1822 |
| 9,444,898 B1* | 9/2016 | Cheng | H04L 51/04 |
| 9,456,074 B2* | 9/2016 | Kim | H04L 51/36 |
| 9,462,115 B2* | 10/2016 | Rand | H04M 1/72448 |
| 9,493,130 B2* | 11/2016 | Penilla | G10L 15/25 |
| 9,509,838 B2* | 11/2016 | Leeds | H04M 3/42051 |
| 9,521,252 B2* | 12/2016 | Leeds | H04M 1/656 |
| 9,583,108 B2* | 2/2017 | Baker, IV | G10L 25/51 |
| 9,614,807 B2* | 4/2017 | Spivack | G06N 20/00 |
| 9,615,229 B2* | 4/2017 | Joo | H04W 4/14 |
| 9,641,471 B2* | 5/2017 | Lee | H04L 51/10 |
| 9,641,609 B2* | 5/2017 | Eidelson | H04L 69/40 |
| 9,666,204 B2* | 5/2017 | Manjunath | G10L 21/003 |
| 9,699,187 B2* | 7/2017 | Chen | H04L 67/36 |
| 9,711,137 B2* | 7/2017 | Baldwin | G10L 15/1815 |
| 9,712,481 B2* | 7/2017 | Harasimiuk | H04L 51/32 |
| 9,712,582 B2* | 7/2017 | Mikkelsen | G06Q 30/0601 |
| 9,716,676 B2* | 7/2017 | Yoon | H04L 51/04 |
| 9,736,089 B2* | 8/2017 | Chen | H04L 51/10 |
| 9,768,974 B1* | 9/2017 | Lewis | H04L 51/24 |
| 9,819,632 B2* | 11/2017 | Marso | H04L 51/16 |
| 9,820,313 B2* | 11/2017 | Kashimba | H04W 76/10 |
| 9,832,621 B2* | 11/2017 | Wen | H04W 4/16 |
| 9,860,308 B2* | 1/2018 | Berajawala | G06F 40/169 |
| 9,916,538 B2* | 3/2018 | Zadeh | G06K 9/627 |
| 9,924,205 B2* | 3/2018 | Xu | H04N 21/4307 |
| 9,934,775 B2* | 4/2018 | Raitio | G10L 13/10 |
| 9,954,803 B1* | 4/2018 | Kominar | H04M 1/724 |
| 9,984,374 B2* | 5/2018 | Saint-Marc | G06F 3/0482 |
| 10,057,204 B2* | 8/2018 | Miller | G06F 16/24578 |
| 10,057,205 B2* | 8/2018 | Spicer | H04L 51/32 |
| 10,074,359 B2* | 9/2018 | Silveira Ocampo | G10L 15/22 |
| 10,097,593 B2* | 10/2018 | Knezevic | H04L 65/1069 |
| 10,116,596 B2* | 10/2018 | Li | H04L 12/1813 |
| 10,157,614 B1* | 12/2018 | Devaraj | H04L 51/22 |
| 10,176,798 B2* | 1/2019 | Gueta | G10L 13/04 |
| 10,192,551 B2* | 1/2019 | Carbune | G10L 15/16 |
| 10,198,517 B2* | 2/2019 | Maxwell | H04L 51/04 |
| 10,224,022 B2* | 3/2019 | Lawrenson | G10L 25/63 |
| 10,235,996 B2* | 3/2019 | Renard | G10L 15/18 |
| 10,242,664 B2* | 3/2019 | Paxinos | G10L 15/08 |
| 10,268,447 B1* | 4/2019 | Dodge | G06F 3/167 |
| 10,268,729 B1* | 4/2019 | Nadav | G06F 16/3329 |
| 10,269,375 B2* | 4/2019 | Arsikere | G10L 25/21 |
| 10,289,433 B2* | 5/2019 | Saddler | G06F 9/453 |
| 10,375,534 B2* | 8/2019 | Rezvani | H04W 4/14 |
| 10,389,881 B1* | 8/2019 | Bird | H04M 3/5191 |
| 10,469,664 B2* | 11/2019 | Pirat | H04L 51/04 |
| 10,481,861 B2* | 11/2019 | Kogan | G06F 16/285 |
| 10,511,718 B2* | 12/2019 | Dickins | H04M 3/568 |
| 10,530,571 B2* | 1/2020 | Moon | H04L 9/065 |
| 10,530,714 B2* | 1/2020 | Ioannou | H04L 67/10 |
| 10,530,818 B2* | 1/2020 | Osman | H04L 65/605 |
| 10,554,611 B2* | 2/2020 | Lewis | H04L 65/4084 |
| 10,735,477 B2* | 8/2020 | Hasegawa | H04L 65/4015 |
| 10,769,622 B2* | 9/2020 | Daniel | G06Q 20/12 |
| 10,775,996 B2* | 9/2020 | Brody | H04M 1/72403 |
| 10,803,705 B2* | 10/2020 | Newton | G07F 17/3244 |
| 10,813,166 B2* | 10/2020 | Baek | H04W 4/10 |
| 10,917,366 B2* | 2/2021 | Cho | G06F 3/0482 |
| 2002/0161882 A1 | 10/2002 | Chatani | |
| 2005/0149399 A1 | 7/2005 | Fukunaga et al. | |
| 2006/0104293 A1 | 5/2006 | Kopp et al. | |
| 2007/0168359 A1 | 7/2007 | Jacob et al. | |
| 2008/0034040 A1* | 2/2008 | Wherry | G06Q 10/107 |
| | | | 709/204 |
| 2008/0120115 A1 | 5/2008 | Mao | |
| 2009/0063995 A1* | 3/2009 | Baron | H04N 21/25866 |
| | | | 715/753 |
| 2010/0195812 A1 | 8/2010 | Florencio et al. | |
| 2013/0067304 A1 | 3/2013 | Peng et al. | |
| 2013/0339015 A1* | 12/2013 | Lee | G10L 21/003 |
| | | | 704/235 |
| 2014/0122601 A1* | 5/2014 | Poston | H04N 21/4307 |
| | | | 709/204 |
| 2014/0236596 A1 | 8/2014 | Martinez | |
| 2014/0242955 A1* | 8/2014 | Kang | G06F 40/58 |
| | | | 455/414.1 |
| 2015/0220507 A1 | 8/2015 | Mohajer et al. | |
| 2015/0287403 A1 | 10/2015 | Holzer zaslansky et al. | |
| 2016/0021039 A1* | 1/2016 | Woo | H04L 12/1827 |
| | | | 715/752 |
| 2016/0112204 A1* | 4/2016 | Cipli | H04L 9/0866 |
| | | | 713/176 |
| 2016/0210985 A1 | 7/2016 | Deleeuw et al. | |
| 2016/0227283 A1* | 8/2016 | Kelly | H04N 21/251 |
| 2017/0185596 A1* | 6/2017 | Spirer | G06Q 30/0201 |
| 2017/0353408 A1 | 12/2017 | Chen | |
| 2017/0359393 A1* | 12/2017 | Rajagopal | H04L 65/1069 |
| 2018/0007404 A1* | 1/2018 | Nanno | H04N 9/8233 |
| 2018/0146088 A1* | 5/2018 | Moshir | H04W 4/12 |
| 2018/0183885 A1* | 6/2018 | Newell | H04L 67/22 |
| 2018/0198831 A1* | 7/2018 | Calcaterra | H04L 67/141 |
| 2020/0274843 A1* | 8/2020 | Fogelson | H04L 51/16 |

FOREIGN PATENT DOCUMENTS

| | | |
|---|---|---|
| CN | 102263705 A | 11/2011 |
| CN | 102594721 A | 7/2012 |
| CN | 103369477 A | 10/2013 |
| CN | 104468584 A | 3/2015 |
| CN | 105280179 A | 1/2016 |
| CN | 105427869 A | 3/2016 |
| CN | 106412263 A | 2/2017 |
| EP | 2595361 A1 | 5/2013 |

(56) References Cited

FOREIGN PATENT DOCUMENTS

| WO | 2015000307 A1 | 1/2015 |
| WO | 2016145379 A1 | 9/2016 |

OTHER PUBLICATIONS

L. R. Rabiner, "Applications of voice processing to telecommunications," in Proceedings of the IEEE, vol. 82, No. 2, pp. 199-228, Feb. 1994, doi: 10.1109/5.265347. (Year: 1994).*

Weihui Dai, Dongmei Han, Yonghui Dai, Dongrong Xu, Emotion recognition and affective computing on vocal social media, Information & Management, vol. 52, Issue 7, 2015, pp. 777-788, ISSN 0378-7206, https://doi.org/10.1016/j.im.2015.02.003. (Year: 2015).*

Colin Ford, Dan Gardner, et al. 2017. Chat Speed OP PogChamp: Practices of Coherence in Massive Twitch Chat. Proceedings of the 2017 CHI Conference Extended Abstracts on Human Factors in Computing Systems (CHI EA '17</i>). Association for Computing Machinery, New York, NY, USA, 858-871. (Year: 2017).*

K. P. Seng and L. Ang, "Video Analytics for Customer Emotion and Satisfaction at Contact Centers," in IEEE Transactions on Human-Machine Systems, vol. 48, No. 3, pp. 266-278, Jun. 2018, doi: 10.1109/THMS.2017.2695613. (Year: 2018).*

"First Office Action and Search Report Issued in Chinese Patent Application No. 201780037806.X", dated Sep. 3, 2020, 21 Pages.

"Celebrity Voice Changer Lite", Retrieved From: https://play.google.com/store/apps/details?id=com.CelebrityVoiceChanger.best.voice.fx.funny.lite, Jun. 21, 2016, 6 Pages.

Brandon, John, "How Higher Emotional Intelligence Will Help Chatbots", Retrieved From: http://venturebeat.com/2016/08/21/how-higher-emotional-intelligence-will-help-chatbots/, Aug. 21, 2016, pp. 1-3.

"Extended European Search Report Issued in European Patent Application No. 17904667.7", dated Oct. 9, 2020, 10 Pages.

"International Search Report and Written Opinion Issued in PCT Application No. PCT/CN17/079698", dated Dec. 29, 2017, 11 Pages.

"Second Office Action Issued in Chinese Patent Application No. 201780037806.X", (w/ English Translation), dated Apr. 16, 2021, 21 Pages.

* cited by examiner

VOICE FORWARDING IN AUTOMATED CHATTING

CROSS-REFERENCE TO RELATED APPLICATIONS

This application is a U.S. National Stage Filing under 35 U.S.C. 371 of International Patent Application Serial No. PCT/CN2017/079698, filed Apr. 7, 2017, and published as WO 2018/184199 A1 on Oct. 11, 2018, which application and publication are incorporated herein by reference in their entirety.

BACKGROUND

Artificial Intelligence (AI) chatbot is becoming more and more popular, and is being applied in an increasing number of scenarios. The chatbot is designed to simulate people's conversation, and may provide an automated chatting service to users by text, speech, image, etc. Generally, the chatbot may scan for keywords within a message inputted by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for voice forwarding in automated chatting. A first request for transmitting a voice segment may be received from a first entity in a service group. The voice segment may be received from the first entity. A voice message may be generated based on the voice segment. The voice message may be transmitted based on the first request.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

A number of network service providers may provide a platform for users to communicate with each other. For example, many people are getting used to communicate with friends and family through social networks or applications, such as, Wechat, Line, Facebook, etc. The network service providers may provide grouping services. The grouping services may refer to social services provided for a group of users having common needs, interests, characteristics, etc. This group of users may also be referred to as a service group. There are various types of grouping service, such as, group chat, interest group, discussion group, etc.

According to embodiments of the present disclosure, a chatbot may facilitate communications among a plenty of users in a service group, and establish an effective voice-based social mechanism among the users. This would enhance social relationship among the users, and improve interestingness of a grouping service.

In some aspects, the chatbot may forward voice among a plurality of users in a service group that are even not friends to each other. The chatbot may also help a user to transmit voice messages, e.g., a voice message specifying recipients or a random voice bottle, to other users in the service group, where the random voice bottle refers to a voice message having no definite recipient.

The chatbot may hide information of a user, who desires to transmit voice, under a requirement of the user. Thus, a voice message may be transmitted in an anonymous way.

A voice emotion classifier established through deep learning may be used by the chatbot to determine an emotion of a voice segment received from a user. The emotion may be used for deciding whether to transmit a voice message generated based on the voice segment.

The chatbot may convert a voice segment inputted by a user into a target voice segment with a specified character's voice. The converting of the voice segment may be in a text level and/or in a tone level. The emotion of the voice segment may also be considered during converting the voice segment.

The chatbot may limit the number of times for transmitting a voice message, thus protecting the privacy of the user who desires to transmit voice.

Figure 1:
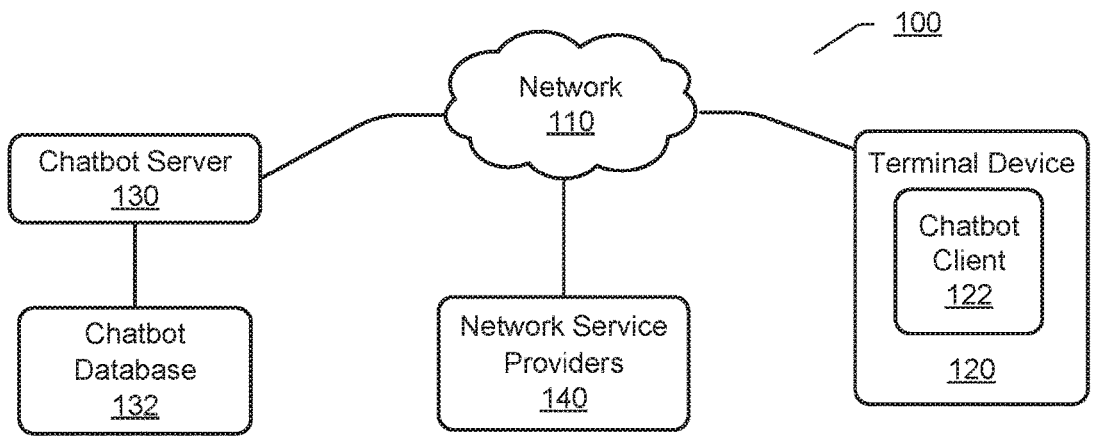
FIG. 1 illustrates an exemplary application scenario of a chatbot according to an embodiment.

FIG. 1 illustrates an exemplary application scenario 100 of a chatbot according to an embodiment.

In FIG. 1, a network 110 is applied for interconnecting among a terminal device 120, a chatbot server 130 and network service providers 140.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be a desktop computer, a laptop, a tablet, a smart phone, etc. Although only one terminal device 120 is shown in FIG. 1, it should be appreciated that a different number of terminal devices may connect to the network 110.

The terminal device 120 may include a chatbot client 122 which may provide automated chatting service to a user. In some implementations, the chatbot client 122 may interact with the chatbot server 130. For example, the chatbot client 122 may transmit messages inputted by the user to the chatbot server 130, and receive responses associated with the messages from the chatbot server 130. However, it should be appreciated that, in other implementations, instead of interacting with the chatbot server 130, the chatbot client 122 may also locally generate responses to messages inputted by the user.

The chatbot server 130 may connect to or incorporate a chatbot database 132. The chatbot database 132 may comprise information that can be used by the chatbot server 130 for generating responses.

The network service providers 140 may refer to various network service websites or applications that can provide grouping services.

In some implementations, a user of the terminal device 120 may access a grouping service from the network service providers 140 through joining a corresponding service group. The chatbot client 122 may operate in the service group to implement voice forwarding in the service group.

It should be appreciated that all the network entities shown in FIG. 1 are exemplary, and depending on specific application requirements, any other network entities may be involved in the application scenario 100.

Figure 2:
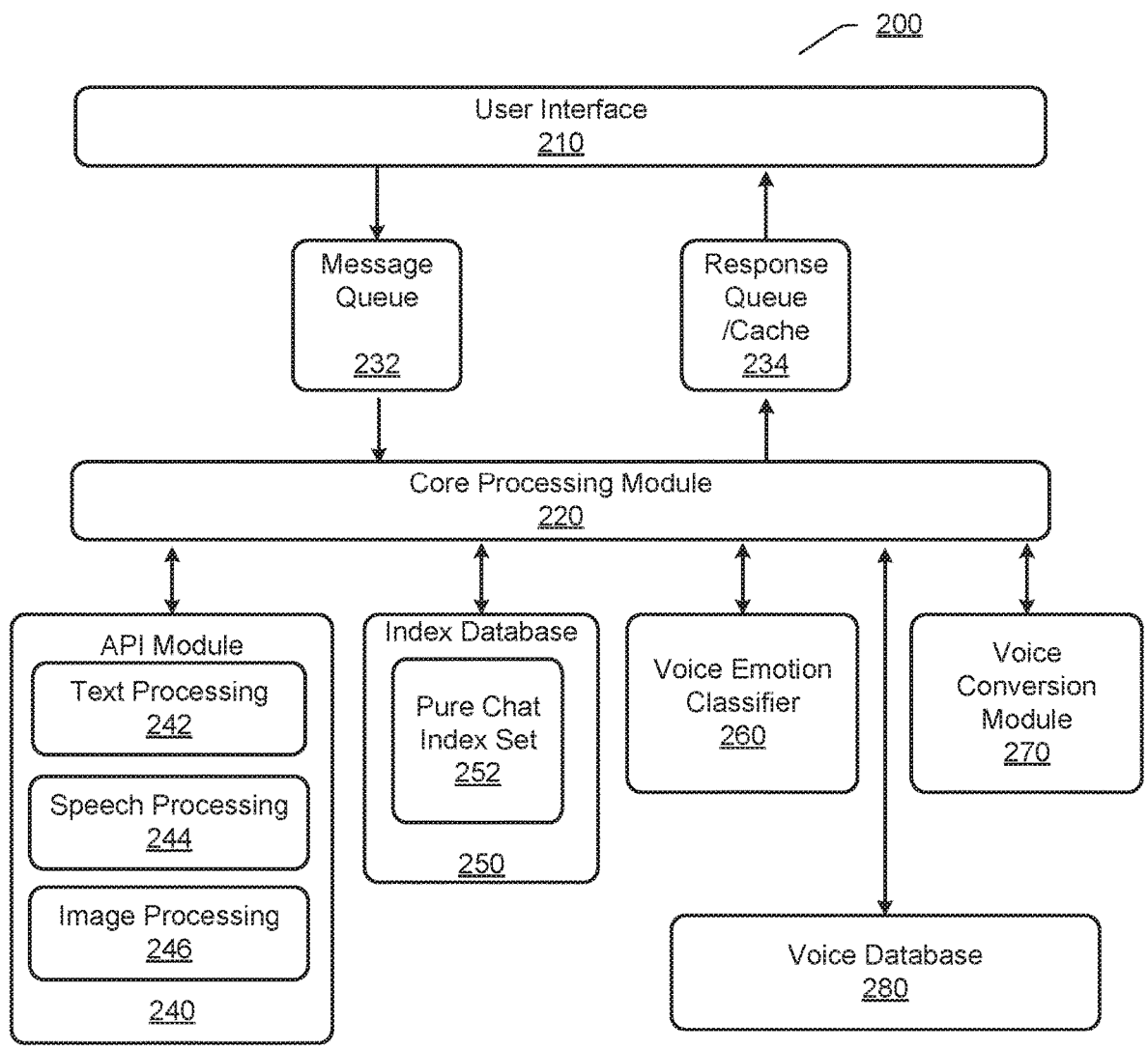
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages inputted by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through an index database 250. The index database 250 may comprise a plurality of index items that can be retrieved by the core processing module 220 as responses. The index items in the index database 250 may be included into a pure chat index set 252. The pure chat index set 252 may comprise index items that are prepared for free chatting between users and the chatbot, and may be established with data from social networks. The index items in the pure chat index set 252 may or may not be in a form of question-answer pair. Moreover, the index database 250 may also comprise any other index sets that can be used for providing responses.

The responses determined by the core processing module 220 may be provided to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message inputted by the player is "Did you eat your breakfast?", two responses may be determined, such as, a first response "Yes, I ate bread" and a second response "How about you? Still feeling hungry?". In this case, through the response cache 234, the chatbot may ensure that the first response is provided to the player immediately. Further, the chatbot may ensure that the second response is provided in a time delay, such as 1 or 2 seconds, so that the second response will be provided to the player 1 or 2 seconds after the first response. As such, the response cache 234 may manage the to-be-sent responses and appropriate timing for each response.

The responses in the response queue or response cache 234 may be further transferred to the user interface 210 such that the responses can be displayed to the user in the chat window.

The system 200 may comprise a voice emotion classifier 260. The voice emotion classifier 260 may be established through deep learning based on a voice emotion training dataset, and may be used for classifying an inputted voice segment into one of a plurality of emotions.

The system 200 may comprise a voice conversion module 270. The voice conversion module 270 may be used for converting an inputted voice segment into a target voice segment with a specified character's voice. The converting of the voice segment may be in a text level and/or in a tone level.

The system 200 may comprise a voice database 280. The voice database 280 may store voice segments inputted by users and/or voice messages generated by the chatbot based on the voice segments.

It should be appreciated that all the elements shown in the chatbot system 200 in FIG. 2 are exemplary, and depending on specific application requirements, any shown elements may be omitted and any other elements may be involved in the chatbot system 200.

Figure 3:
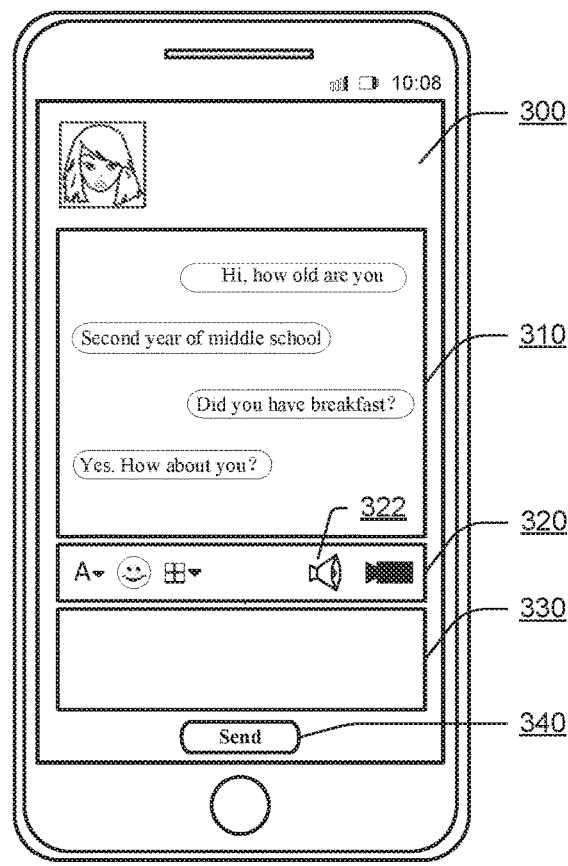
FIG. 3 illustrates an exemplary user interface between a chatbot and a user according to an embodiment.

FIG. 3 illustrates an exemplary user interface 300 between a chatbot and a user according to an embodiment. The user interface 300 is included in a terminal device, and may comprise a presentation area 310, a control area 320 and an input area 330. The presentation area 310 displays messages and responses in a chat flow. Herein, the chat flow may refer to a chatting procedure including messages from the user and responses from the chatbot. The control area 320 includes a plurality of virtual buttons for the user to perform message input settings. The user may select a virtual button in the control area 320 to make a voice input, attach image files, select emoji symbols, make a short-cut of the current screen, etc. For example, when the user touches or clicks a speaker button 322, a voice segment or a voice message in the chat flow may be played through a speaker of the terminal device. The input area 330 is used for the user to input messages. For example, the user may type text through the input area 330. The chat window 300 may further comprise a virtual button 340 for confirming to send inputted messages. If the user touches the virtual button 340, the messages inputted in the input area 330 may be sent to the presentation area 310.

It should be noted that all the elements and their layout shown in FIG. 3 are exemplary. Depending on specific application requirements, the chat window in FIG. 3 may omit or add any elements, and the layout of the elements in the chat window in FIG. 3 may also be changed in various manners. For example, although the speaker button 322 is shown in the control area 320, the speaker button 322 may also be omitted from the control area 320. Instead, a speaker icon presented in the chat flow may function as the speaker button 322.

Figure 4:
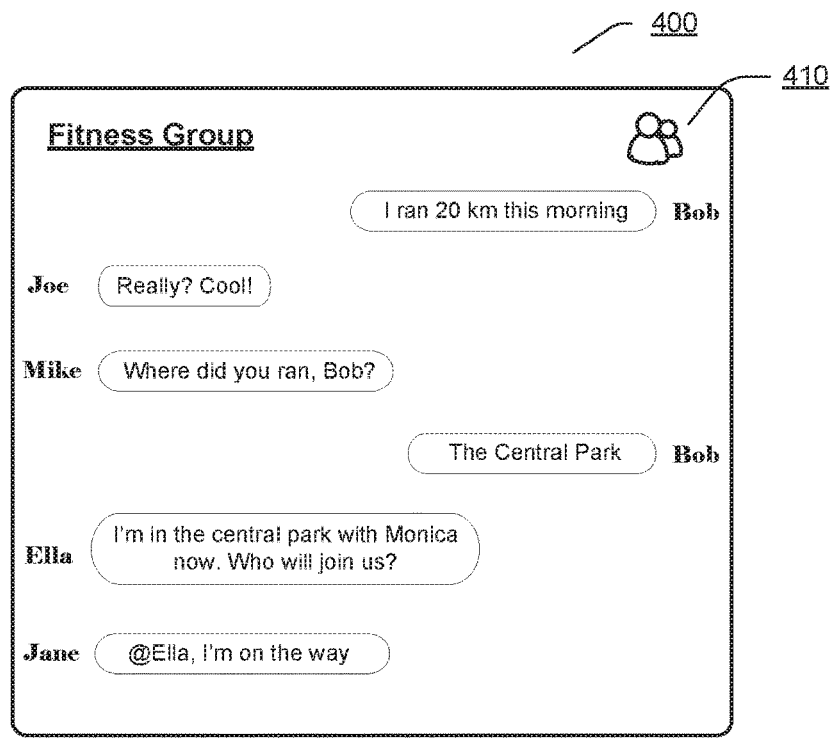
FIG. 4 illustrates an exemplary chat window in a group chat according to an embodiment.

FIG. 4 illustrates an exemplary chat window 400 in a group chat according to an embodiment. It should be appreciated that the group chat in FIG. 4 is an example of one of various types of grouping service. As mentioned above, the types of grouping service may be various and do not limit to a group chat.

As shown in FIG. 4, a group chat is going on in a "Fitness Group". There is a plurality of users in the Fitness Group, such as, Bob, Joe, Mike, Ella, Jane, etc. When an icon 410 is touched or clicked, the users being in the Fitness Group may be presented. These users may chat in the chat window 400.

It should be appreciated that, although not shown, a chatbot may also operate in or be included in the Fitness Group, and thus the chatbot may implement voice forwarding according to the embodiments of the present disclosure.

Figure 5:
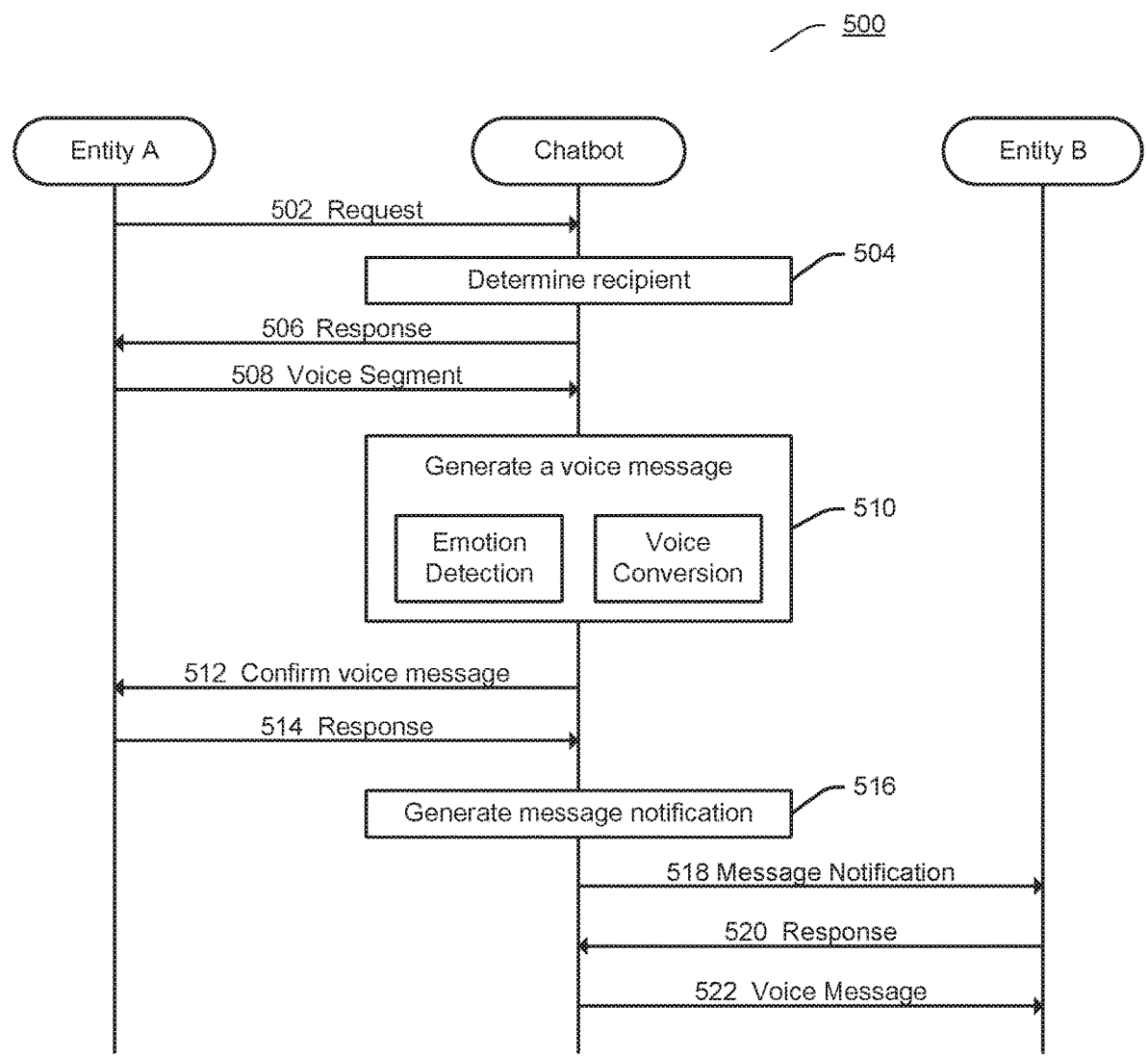
FIG. 5 illustrates a flowchart of an exemplary method for voice forwarding according to an embodiment.

FIG. 5 illustrates a flowchart of an exemplary method 500 for voice forwarding according to an embodiment. According to the method 500, an entity A in a service group may request the chatbot to forward voice to an entity B in the service group, and the chatbot may generate a voice message based on a voice segment inputted by the entity A and transmit the voice message to the entity B. Herein, an "entity" may refer to a member in a service group, a user in a service group, a terminal device of a user in a service group, etc.

At 502, the entity A may transmit a request to the chatbot to indicate that the entity A desires to transmit a voice segment to the entity B. The entity A may transmit the request in a chat flow between the entity A and the chatbot.

In an implementation, the entity A may require, in the request, to transmit a voice segment to the entity B anonymously so that the chatbot would not denote or show sender information, e.g., ID of the entity A, to the entity B. For example, the request may be "Send a voice to Mike anonymously".

In an implementation, the entity A may specify a voice preference in the request so that the voice segment can be converted by the chatbot based on the voice preference. The voice preference may be a specified character's voice. For example, the request may be "Send a voice to Mike in the voice of Angelina Jolie".

At 504, the chatbot may determine a recipient from the request. For example, if the request is "Send a voice to Mike", the chatbot may determine that the recipient is "Mike".

If the recipient in the request is not valid, e.g., not found in the service group, the chatbot may require the entity A to input a recipient again. If the recipient in the request is valid, the chatbot may transmit a response to the entity A at 506. This response may comprise guidance for inputting a voice segment, such as "Please touch the microphone icon during speaking".

In an implementation, the response at 506 may also comprise attention information on a length of a voice segment to be inputted, such as, "Note that the maximum voice is 60 seconds". Through setting a time threshold on the maximum length of the voice segment, it can be avoided that the recipient loses patience to listen to the whole voice message because of a too long lasting time of the voice message. The time threshold may be predetermined as any values, e.g., 60 seconds.

At 508, the entity A may input the voice segment according to the response received at 506. For example, the entity A may touch a microphone icon in the response received at 506 and speak out a segment of voice.

At 510, the chatbot may generate a voice message based on the voice segment received at 508.

In an implementation, the chatbot may include the voice segment into the voice message directly. For example, the voice segment may be used as the voice message directly.

In an implementation, the chatbot may perform emotion detection on the voice segment at 510. For example, the chatbot may detect an emotion of the voice segment through a voice emotion classifier. It the emotion of the voice segment is detected to be one of negative emotions, the chatbot may require the entity A to input another voice segment.

In an implementation, if the entity A specifies a voice preference in the request at 502, the chatbot may perform voice conversion at 510 so as to convert the voice segment into a target voice segment that is based on the voice preference as requested by the entity A. The target voice segment may be included in the voice message.

At 512, the chatbot may require the entity A to confirm whether to transmit the voice message. In an implementation, the chatbot may transmit the voice message to the entity A at 512. The chatbot may further transmit a confirmation question, such as "Are you sure to send it?", together with the voice message at 512.

At 514, the entity A may transmit to the chatbot a response for confirming whether or not to transmit the voice message. For example, the entity A may transmit a response "Sure", "Please go ahead", etc. at 514.

If the entity A confirms to transmit the voice message at 514, the chatbot may generate a message notification at 516. The message notification may be used for notifying the entity B to receive the voice message generated at 510.

In an implementation, the message notification may include a length of the voice message and sender information, such as, "You received a voice message in 36 seconds from Bob". It should be appreciated that, if the entity A requires transmitting anonymously, the sender information may also be omitted from the message notification. Thus, the message notification may be, such as, "You received an anonymous voice message in 36 seconds".

In an implementation, the message notification may include guidance for listening to the voice message, such as "Please touch the speaker icon during listening".

In an implementation, the message notification may include the emotion of the voice segment detected at 510, such as, "You received a voice message with a major emotion of happy".

At 518, the chatbot may transmit the message notification to the entity B.

At 520, the chatbot may receive a response from the entity B. The response may be, such as, an operation of touching the speaker icon by the entity B, which indicates that the entity B desires to listen to the voice message.

At 522, the chatbot may transmit the voice message to the entity B. Thus, the entity B may listen to the voice message generated based on the voice segment inputted from the entity A.

As discussed above, the method 500 may enable the chatbot to forward voice from an entity to another identified entity in the service group.

It should be appreciated that, although only one recipient, entity B, is shown in FIG. 5, there may be more than one recipient for the voice message. In other words, the entity A may identify one or more recipients in the request at 502, and thus the chatbot may transmit the voice message to these recipients respectively according to the request.

It should be appreciated that, depending on specific application requirements, sequence orders of the operations in the method 500 may be changed in various approached. Moreover, any operations may be added or omitted in the method 500.

Figure 6:
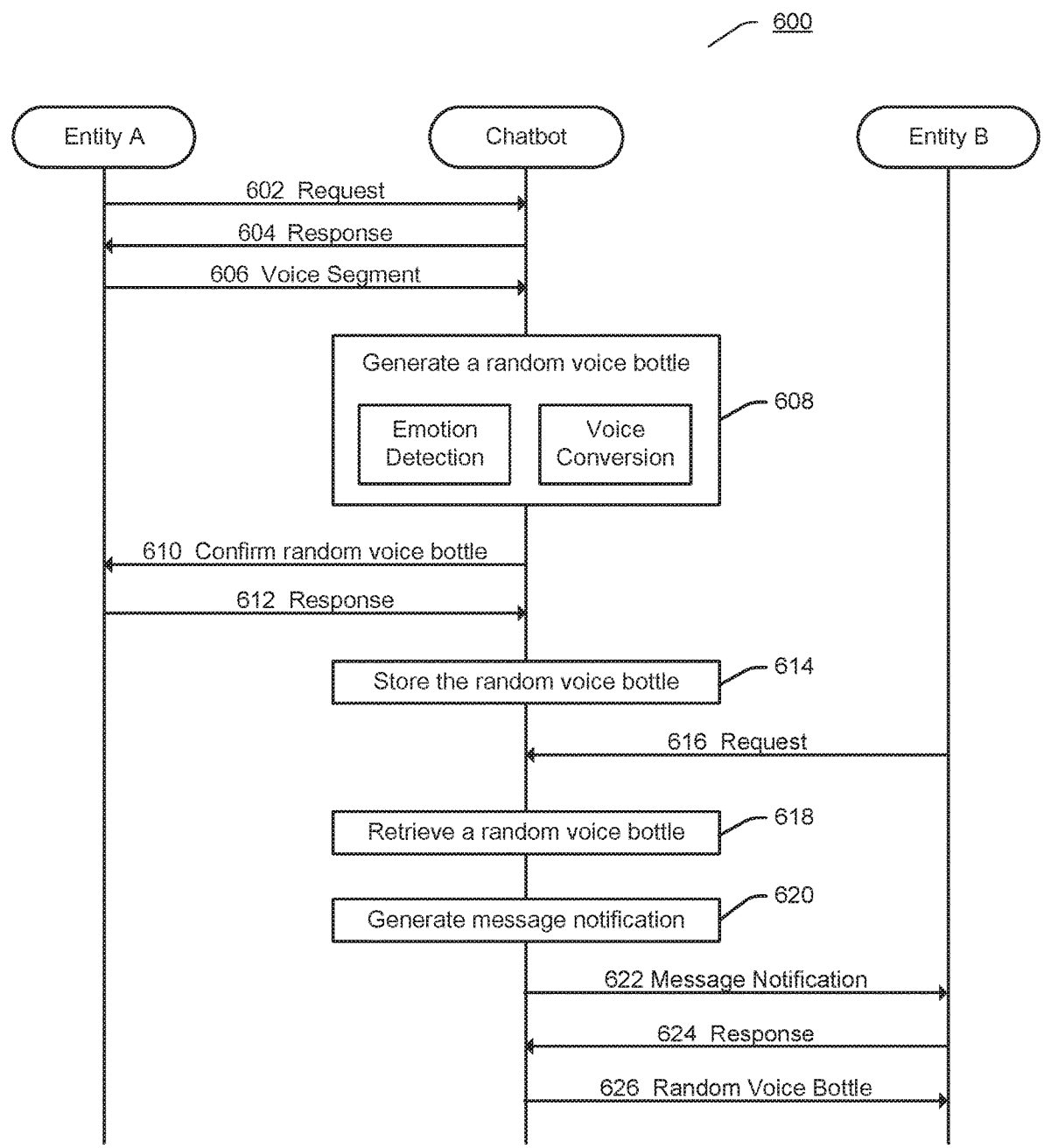
FIG. 6 illustrates a flowchart of an exemplary method for voice forwarding according to an embodiment.

FIG. 6 illustrates a flowchart of an exemplary method 600 for voice forwarding according to an embodiment. According to the method 600, an entity A in a service group may request the chatbot to transmit a random voice bottle, and the chatbot may transmit a random voice bottle to an entity B in the service group who is requesting to receive a random voice bottle. Herein, the "random voice bottle" may be a voice message transmitted randomly, e.g., a voice message having no definite recipient. The random voice bottle may also be referred to as "random voice message", "randomly-transmitted voice message", "voice drift bottle", etc.

At 602, the entity A may transmit a request to the chatbot to indicate that the entity A desires to transmit a random voice bottle. The entity A may transmit the request in a chat flow between the entity A and the chatbot. For example, the request may be "Send a random voice bottle".

In an implementation, the entity A may require, in the request, to transmit the random voice bottle anonymously so that the chatbot would not denote sender information, e.g., ID of the entity A, to a recipient. For example, the request may be "Send a random voice bottle anonymously".

In an implementation, the entity A may specify a voice preference in the request so that a voice segment from the entity A can be converted by the chatbot based on the voice preference. For example, the request may be "Send a random voice bottle in the voice of Angelina Jolie".

At 604, the chatbot may transmit a response to the entity A. This response may comprise guidance for inputting a voice segment. This response may also comprise attention information on a length of a voice segment to be inputted.

At 606, the entity A may input a voice segment according to the response received at 604. For example, the entity A may touch a microphone icon in the response received at 604 and speak out a segment of voice.

At 608, the chatbot may generate a random voice bottle based on the voice segment received at 606.

In an implementation, the chatbot may include the voice segment into the random voice bottle directly.

In an implementation, the chatbot may perform emotion detection on the voice segment at 608. It the emotion of the voice segment is detected to be one of negative emotions, the chatbot may require the entity A to input another voice segment.

In an implementation, if the entity A specifies a voice preference in the request at 602, the chatbot may perform voice conversion at 608 so as to convert the voice segment into a target voice segment that is based on the voice preference as requested by the entity A. The target voice segment may be included in the random voice bottle.

At 610, the chatbot may require the entity A to confirm whether to transmit the random voice bottle. In an implementation, the chatbot may transmit the random voice bottle to the entity A at 610. The chatbot may further transmit a confirmation question, such as "Are you sure to send it?", together with the random voice bottle at 610.

At 612, the entity A may transmit to the chatbot a response for confirming whether or not to transmit the random voice bottle. For example, the entity A may transmit a response "Sure", "Please go ahead", etc. at 612.

If the entity A confirms to transmit the random voice bottle at 612, the chatbot may store the random voice bottle in a voice database at 614. It should be appreciated that the voice database may also store other random voice bottles from other entities in the service group.

At 616, the chatbot may receive a request from the entity B to indicate that the entity B desires to receive a random voice bottle. For example, the request at 616 may be "Pick a bottle", etc. The entity B may be any entity in the service group.

When receiving the request at 616, the chatbot may retrieve a random voice bottle from the voice database at 618. The retrieved random voice bottle may be from the entity A, or any other entities in the service group who have requested to transmit random voice bottles.

At 620, the chatbot may generate a message notification for the retrieved random voice bottle. The message notification may be used for notifying the entity B to receive the random voice bottle.

The message notification may include a length of the random voice bottle and sender information. If the sender of the random voice bottle requires transmitting anonymously, the sender information may also be omitted from the message notification. The message notification may include guidance for listening to the random voice bottle. The message notification may include the emotion of the random voice bottle.

At 622, the chatbot may transmit the message notification to the entity B.

At 624, the chatbot may receive a response from the entity B. The response may be, such as, an operation of touching the speaker icon by the entity B, which indicates that the entity B desires to listen to the random voice bottle.

At 626, the chatbot may transmit the random voice bottle to the entity B. Thus, the entity B may listen to the random voice bottle.

As discussed above, the method 600 may enable the chatbot to forward random voice bottles among entities in the service group.

It should be appreciated that, depending on specific application requirements, sequence orders of the operations in the method 600 may be changed in various approached. Moreover, any operations may be added or omitted in the method 600.

It should be appreciated that, in some implementations, both the method 500 in FIG. 5 and the method 600 in FIG. 6 may further comprise an access control process. The chatbot may allow a recipient entity to access, e.g., listen to, a voice message only one time. Moreover, the chatbot may control a voice message, such as a random voice bottle, to be accessible by a limited number of times.

The chatbot may maintain a control data structure for a voice message. The control data structure may be, such as, {[Entity ID, Accessible Flag=True or False], current access number}. If an entity has accessed a voice message, the accessible flag for this entity will be changed from True to False, and thus this entity would not be able to access the voice message again. Meanwhile, the current access number will be updated, e.g., increased by one. When the current access number reaches a threshold, no entity would be allowed to access the voice message any more. This means that the chatbot will not forward the voice message to any recipients if the voice message has been transmitted for a predetermined number of times. Considering that accesses by different entities may result in attempts to update the current access number at the same time, a lock function may be implemented in order to control the updating of the current access number. For example, only one thread from one entity can update the current access number at one time point.

As discussed above, the embodiments of the present disclosure may adopt a voice emotion classifier to detect an emotion of a voice segment. Conventional emotion analysis can only classify inputted text into a limited number of emotions, such as, positive emotion, negative emotion and neural emotion. While the voice emotion classifier according to the embodiments of the present disclosure may perform a fine-grained emotion analysis which can classify an inputted voice segment into a greater number of emotions.

In an implementation, the voice emotion classifier may discriminate 8 types of emotions, including happy, angry, fearful, contemptuous, sad, surprise, disgusted and neutral. It should be appreciated that although the following discussion is related to the voice emotion classifier with 8 types of emotions, the embodiments of the present disclosure are not limited to 8 types of emotions. Instead, voice emotion classifiers with any other number of emotion types may be also obtained and applied under the concept of the present disclosure.

The voice emotion classifier may be trained through deep learning based on a voice emotion training dataset. The voice emotion training dataset may be obtained from a text emotion training dataset and a speech recognition training dataset.

Figure 7:
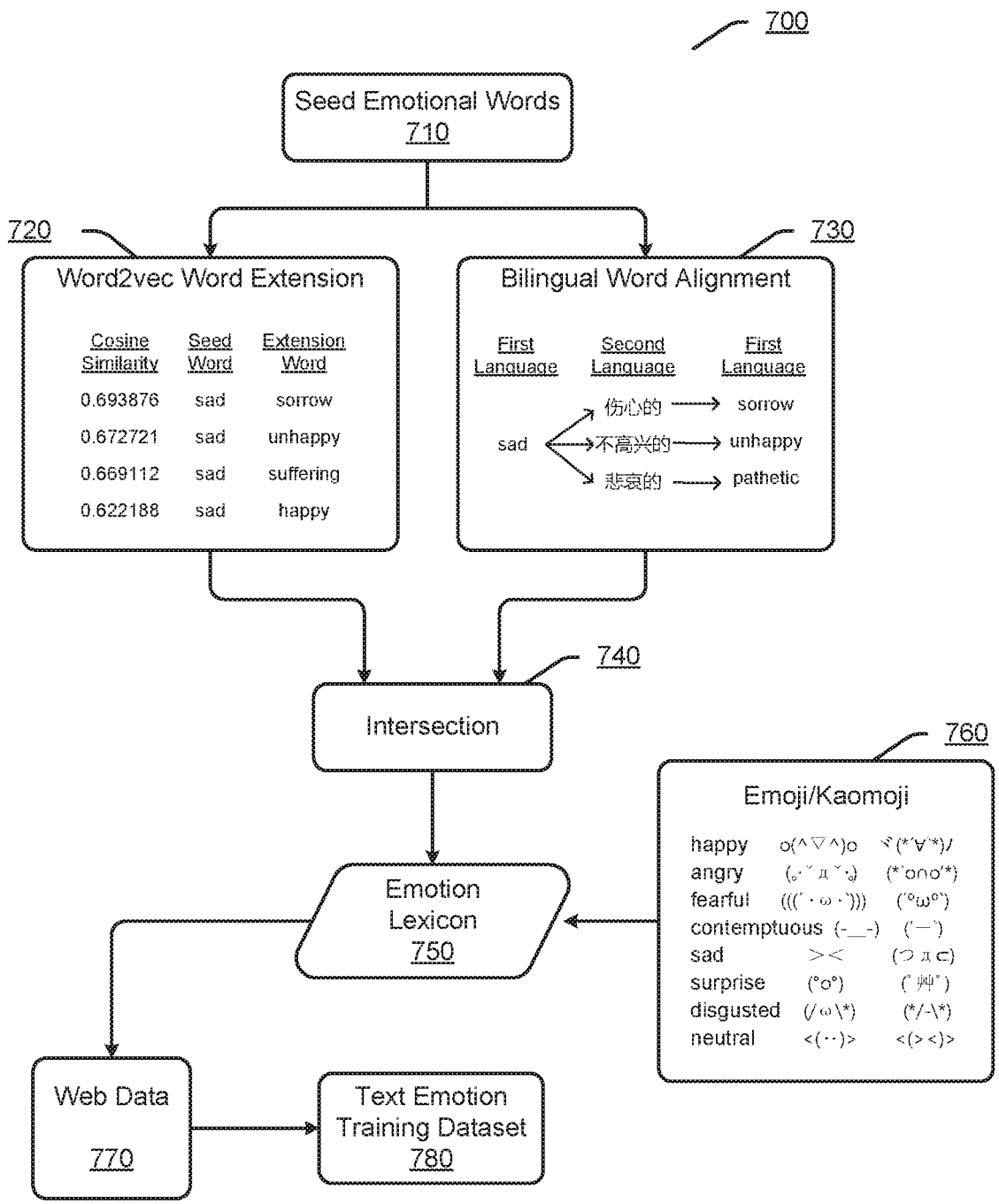
FIG. 7 illustrates an exemplary process for obtaining a text emotion training dataset according to an embodiment.

FIG. 7 illustrates an exemplary process 700 for obtaining a text emotion training dataset according to an embodiment. The process 700 may be performed for generating an emotion lexicon by extending seed emotional words, and further determining a text emotion training dataset by using the emotion lexicon.

Taking 8 types of emotions as an example, an exemplary sentence with the emotion "happy" may be "I'm so glad to hear that!". An exemplary sentence with the emotion "angry" may be "How dare you ignore that!". An exemplary sentence with the emotion "fearful" may be "It's a terrible accident". An exemplary sentence with the emotion "contemptuous" may be "only a computer cannot be that swagger". An exemplary sentence with the emotion "sad" may be "I don't like it and want to cry". An exemplary sentence with the emotion "surprise" may be "What? Really?". An exemplary sentence with the emotion "disgusted" may be "He is more stupid than I expected". An exemplary sentence with the emotion "neutral" may be "Tomorrow's schedule is determined".

At 710, seed emotional words may be obtained. Herein, the seed emotional words may include emotional words corresponding to each type of emotion. For example, the seed emotional words may include a plurality of words corresponding to the emotion "happy", such as, "happy", "pleased", "glad", "blessed", etc. The seed emotional words may be obtained from existing manually-constructed lexicons that contain words with manually-labeled emotional polarities. These manually-constructed lexicons can only provide a limited number of seed emotional words.

At 720, a Word2vec word extension may be performed based on the seed emotional words so as to extend the seed emotional words. A Word2vec cosine similarity score for each seed emotional word and a word from a corpus may be computed. In this way, a number of words, from the corpus, with computed cores may be collected for each emotional word, and then a plurality of top-ranked words may be determined as extension to the seed emotional word. For example, as shown in FIG. 7, for the seed emotional word "sad", extension words "sorrow", "unhappy", "suffering", "happy", etc. may be determined based on the computed Word2vec cosine similarity scores.

It should be appreciated that Word2vec cosine similarity score is computed based on, such as, positions of words in sentences. Thus, the Word2vec word extension cannot ensure that all the extension words have a similar semantic meaning with the corresponding seed emotional word. For example, in FIG. 7, "happy" is determined as an extension word to the seed emotional word "sad", however, these two words have different semantic meanings. Thus, the process 700 further comprises a pruning mechanism, which is based on bilingual word alignment, for removing those extension words having different semantic meanings or weak semantic relevance from corresponding seed emotional words.

At 730, bilingual word alignment may be performed. The bilingual word alignment may be used for finding semantically relevant words to a seed word through a round-trip translation between two different languages. A seed emotional word in a first language may be translated into words in a second language. For example, the seed emotional word "sad" in English may be translated into words "伤心的", "不高兴的" and "悲哀的" in Chinese. Then, the words in the second language may be translated back into words in the first language. For example, the words "伤心的", "不高兴的" and "悲哀的" in Chinese may be translated back into words "sorrow", "unhappy" and "pathetic" in English. Thus, a list of words "sorrow", "unhappy" and "pathetic" may be obtained through the bilingual word alignment for the seed emotional word "sad".

At 740, an intersection operation may be performed on the extension words obtained by the Word2vec word extension at 720 and the word list obtained by the bilingual word alignment at 730. The intersection operation may be used for removing those extension words, obtained by the Word2vec word extension, having different semantic meanings or weak semantic relevance from corresponding seed emotional words. For example, in FIG. 7, through the intersection operation, the words "sorrow" and "unhappy" may be retained, while the word "suffering" having weak semantic relevance from "sad" and the word "happy" having different semantic meanings from "sad" are removed.

The retained words through the intersection operation may be appended to an emotion lexicon 750. In an implementation, words in the emotion lexicon 750 may be further added by corresponding emoticons, e.g., emoji or kaomoji. At 760, emoji or kaomoji may be collected from the network for each type of emotions. For example, for the emotion "sad", its corresponding emoticons may include, such as, "><", "(つ д ⊂)", etc. Accordingly, these emoticons may be appended to the words "sad", "sorrow" and "unhappy" corresponding to the emotion "sad" in the emotion lexicon 750.

As discussed above, the emotion lexicon 750 is established by performing Word2vec word extension and bilingual word alignment on seed emotional words, and may include much more words than the manually-constructed lexicons. The emotion lexicon 750 may be used for finding sentences, from web data 770, that contain at least one word in the emotion lexicon 750. Each of the sentences may be labeled by an emotion of a corresponding word in the emotion lexicon 750 that this sentence contains. These sentences together with corresponding emotional labels may be denoted as <text, emotion>, and may form a text emotion training dataset 780.

Figure 8:
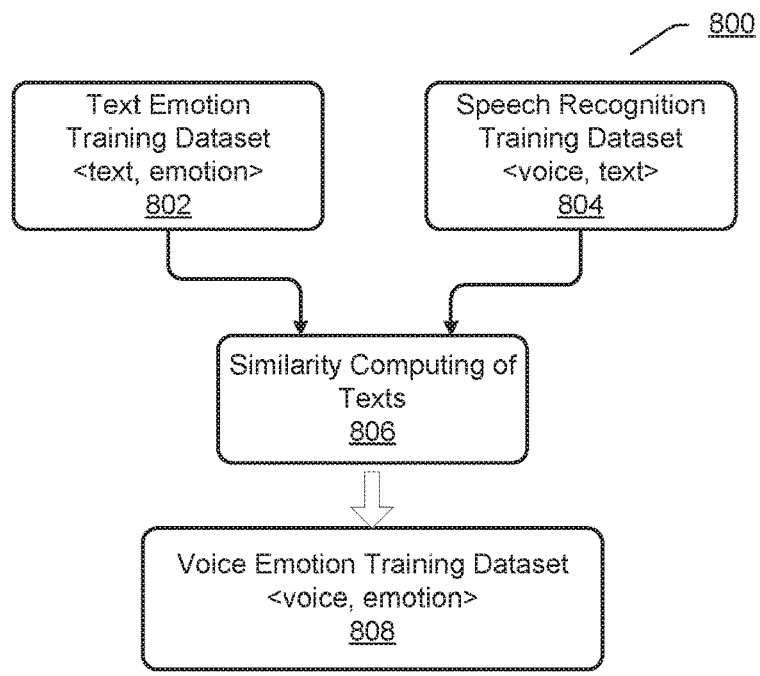
FIG. 8 illustrates an exemplary process for obtaining a voice emotion training dataset according to an embodiment.

FIG. 8 illustrates an exemplary process 800 for obtaining a voice emotion training dataset according to an embodiment.

The text emotion training dataset 802 in FIG. 8 may be obtained through the process 700 in FIG. 7, which includes a set of training data items in a form of <text, emotion>.

The speech recognition training dataset 804 may include a set of training data items in a form of <voice, text>. The voice in a training data item may be obtained from a voice corpus, and the text in the training data item may be generated through performing speech recognition on the voice.

At 806, the process 800 may compute similarity scores between texts in the text emotion training dataset 802 and texts in the speech recognition training dataset 804. The similarity cores computed at 806 may be, e.g., Word2vec similarity scores.

At 808, a voice emotion training dataset may be generated. The voice emotion training dataset may include a set of training data items in a form of <voice, emotion>. For example, if it is determined, through the similarity computing at 806, that "text." in a training data item m<$text_m$, $emotion_m$> in the text emotion training dataset 802 and "$text_k$" in a training data item k<$voice_k$, $text_k$> in the speech recognition training dataset 804 have the top-ranked similarity score, then a training data item<$voice_k$, $emotion_m$> may be generated for the voice emotion training dataset.

Through the process 800 in FIG. 8, a large-scale voice emotion training dataset may be obtained, which can be further used for training a voice emotion classifier through deep learning.

Figure 9:
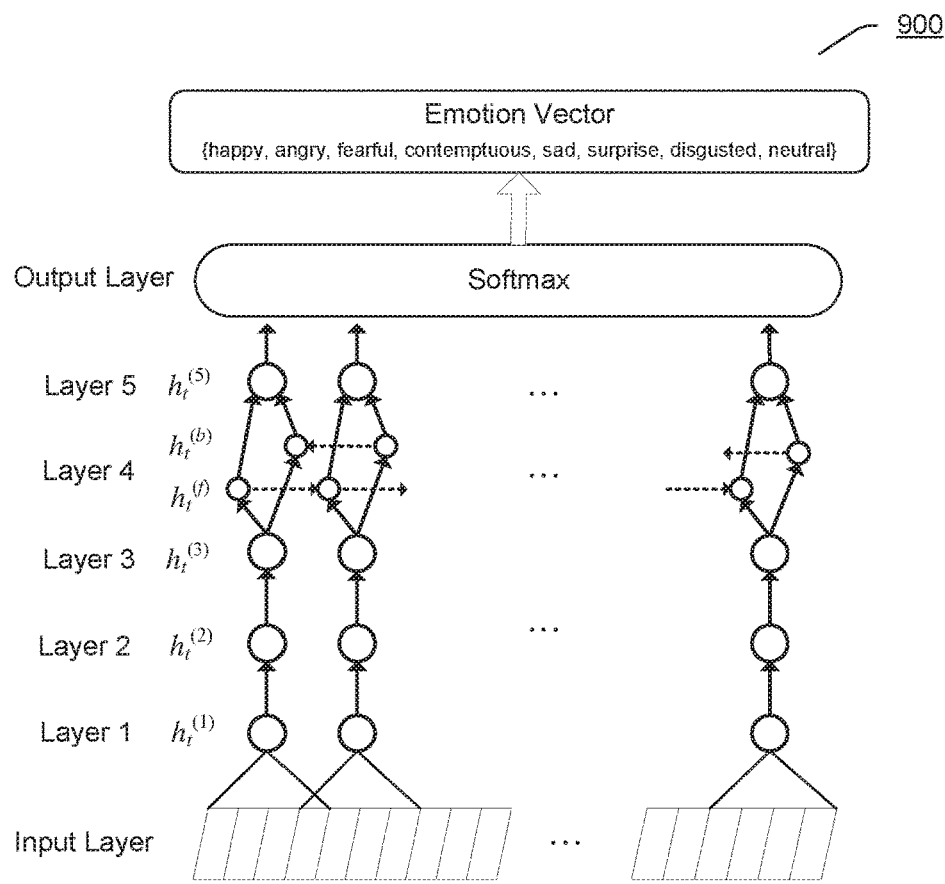
FIG. 9 illustrates an exemplary structure of a voice emotion classifier according to an embodiment.

FIG. 9 illustrates an exemplary structure 900 of a voice emotion classifier according to an embodiment. The voice emotion classifier may be based on an end-to-end voice emotion classification model which may adopt, such as, a Gated Recurrent Unit (GRU) neural network. Herein, "end-to-end" may refer to inputting a voice segment at one end, and outputting a prediction of emotion at another end.

A voice emotion training dataset may be used for training the voice emotion classifier. The voice emotion training dataset may be, such as, $\{(x^{(1)}, y^{(1)}), (x^{(2)}, y^{(2)}), \ldots\}$, where $x^{(i)}$ corresponds to an input voice segment and may be a digital voice vector represented by spectrograms, and $y^{(i)}$ denotes an output emotion type.

The goal of the GRU neural network is to project an input voice segment x into an emotion type y, with $y = \mathrm{argmax}_y P(c|x)$, where c takes one value from {happy, angry, fearful, contemptuous, sad, surprise, disgusted, neutral}.

A voice segment $x^{(i)}$ may be inputted in an Input Layer. The voice segment $x^{(i)}$ may be a time-series with a length of $T^{(i)}$, and each slice is a vector of audio features, denoted as $x_t^{(i)}$, where $t = 1, 2, \ldots, T^{(i)}$. Spectrograms may be used as input features, for example, $x_{t,p}^{(i)}$ may denote a power of the p's frequency bin in the voice segment at time t.

The GRU neural network may comprise 5 layers of hidden units, shown as Layer 1 to Layer 5 in FIG. 9. For an input sequence x, hidden units in Layer 1 are denoted as $h^{(l)}$, with a special case that $h^{(0)}$ may stand for the input sequence.

Layer 1, Layer 2 and Layer 3 are not recurrent layers. For Layer 1, at each time t, an output depends on a spectrogram frame $x_t$ along with a context of S frames on each side. Empirically, the value of S may be selected from {3, 5, 7, 9} that minimum an error rate of a valuation set. Layer 2 and Layer 3 operate on independent data for each time step. Thus, for each time t, the first 3 layers may be computed as:

$$h_t^l = g(W^{(l)} h_t^{(l-31)} + b^{(l)}) \qquad \text{Equation (1)}$$

In Equation (1), a clipped Rectified-Linear (ReLu) activation function g(z) is used, and $W^{(l)}$ and $b^{(l)}$ are weight matrix and bias parameter for Layer 1 respectively. The function g(z) may be denoted as $g(z) = \min\{\max\{\alpha, z\}, \beta\}$, where α and β are hyper-parameters, and can be adjusted empirically.

Layer 4 is a bi-directional recurrent layer. This layer includes two sets of hidden units, one set for forward recurrence $h^{(f)}$, and another set for backward recurrence $h^{(b)}$.

Internal mechanism of the GRU may be defined by the following equations:

$$z_t = \sigma(W^{(z)}x_t + U^{(z)}h_{t-1} + b^{(z)}) \quad \text{Equation (2)}$$

$$r_t = \sigma(W^{(r)}x_t + U^{(r)}h_{t-1} + b^{(r)}) \quad \text{Equation (3)}$$

$$\tilde{h}_t = \tanh(Wx_t + r_t \circ Uh_{t-1} + b^{(h)}) \quad \text{Equation (4)}$$

$$h_t = z_t \circ h_{t-1} + (1 - z_t) \circ \tilde{h}_t \quad \text{Equation (5)}$$

where ° is an element-wise product, $W^{(z)}$, $W^{(r)}$, $W$, $U^{(z)}$, $u^{(r)}$, $U$ are weight matrixes by training, $W^{(z)}$, $W^{(r)}$, $W \in R^{n_H \times n_I}$, and $U^{(z)}$, $U^{(r)}$, $U \in R^{n_H \times n_H}$, Here, $n_H$ denotes a dimension of hidden layer, and $n_I$ denotes a dimension of input layer. The above equations may also be abbreviated as:

$$h_t = \text{GRU}(x_t, h_{t-1}) \quad \text{Equation (6)}$$

Thus, $h^{(f)}$ and $h^{(b)}$ can be expressed by:

$$h_t^{(f)} = \text{GRU}(h_t^{(3)}, h_{t-1}^{(f)}) \quad \text{Equation (7)}$$

$$h_t^{(b)} = \text{GRU}(h_t^{(3)}, h_{t-1}^{(b)}) \quad \text{Equation (8)}$$

Note that $h^{(f)}$ is computed sequentially from t=1 to t=$T^{(i)}$, and $h^{(b)}$ is computed sequentially in a reverse direction from t=$T^{(i)}$ back to t=1.

Layer 5 is a non-recurrent layer, which takes a concatenation of the forward units and the backward units in Layer 4 as inputs, and may be computed as:

$$h_t^5 = g(W^{(5)}h_t^{(4)} + b^{(5)}) \quad \text{Equation (9)}$$

where $h_t^{(4)}$ is the concatenation of $h_t^{(f)}$ and $h_t^{(b)}$.

The Output Layer is a standard Softmax function that yields predicated emotion type probabilities. This layer may map from Layer 5 to an emotion vector having 8 dimensions, each element in the emotion vector being a probability of a corresponding emotion.

The voice emotion classifier established according to FIG. 9 may be used for detecting an emotion of a voice segment. For example, as shown in FIG. 9, when the voice segment is inputted in the Input Layer, an emotion vector may be outputted from the Output Layer, and an emotion having the highest probability among the 8 types of emotions may be selected as the emotion or major emotion of the voice segment.

Figure 10:
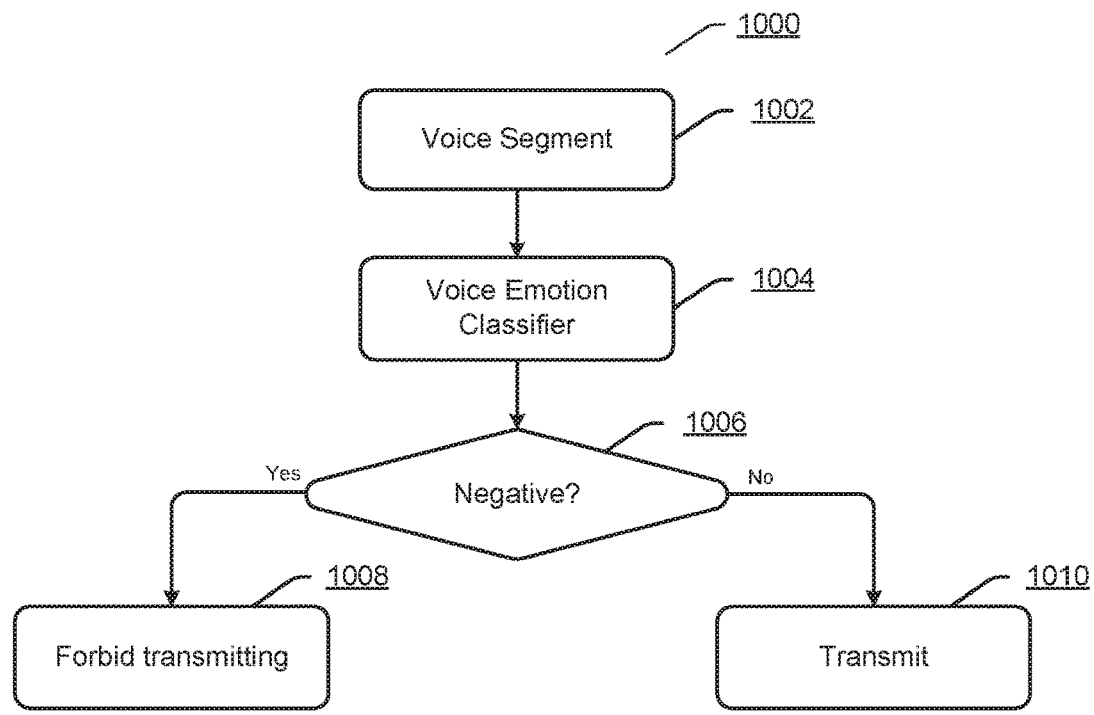
FIG. 10 illustrates a flowchart of an exemplary method for controlling voice message transmission according to an embodiment.

FIG. 10 illustrates a flowchart of an exemplary method 1000 for controlling voice message transmission according to an embodiment. The voice emotion classifier established according to FIG. 9 may be adopted in the method 1000.

At 1002, a voice segment may be obtained. For example, the voice segment may be received by the chatbot at 508 in FIG. 5 or at 606 in FIG. 6.

At 1004, the voice emotion classifier may be used for detecting an emotion of the voice segment. In an implementation, the voice emotion classifier may discriminate 8 types of emotions, and thus the voice emotion classifier may classify the voice segment into one of the 8 types of emotions.

At 1006, it is determined whether the detected emotion is negative. In an implementation, any one of angry, fearful, contemptuous, sad and disgusted emotions may be determined as a negative emotion, while the happy, surprise and neutral emotions may be determined as non-negative emotions. In another implementation, the surprise emotion may also be determined as a negative emotion.

If it is determined that the emotion of the voice segment is negative, then at 1008, the chatbot may forbid transmitting a voice message that is generated based on the voice segment. Else if it is determined that the emotion of the voice segment is not negative, then at 1010, the chatbot may allow transmitting the voice message.

Through the method 1000, the chatbot may avoid forwarding noisy, dirty or negative voice messages to recipients.

Figure 11:
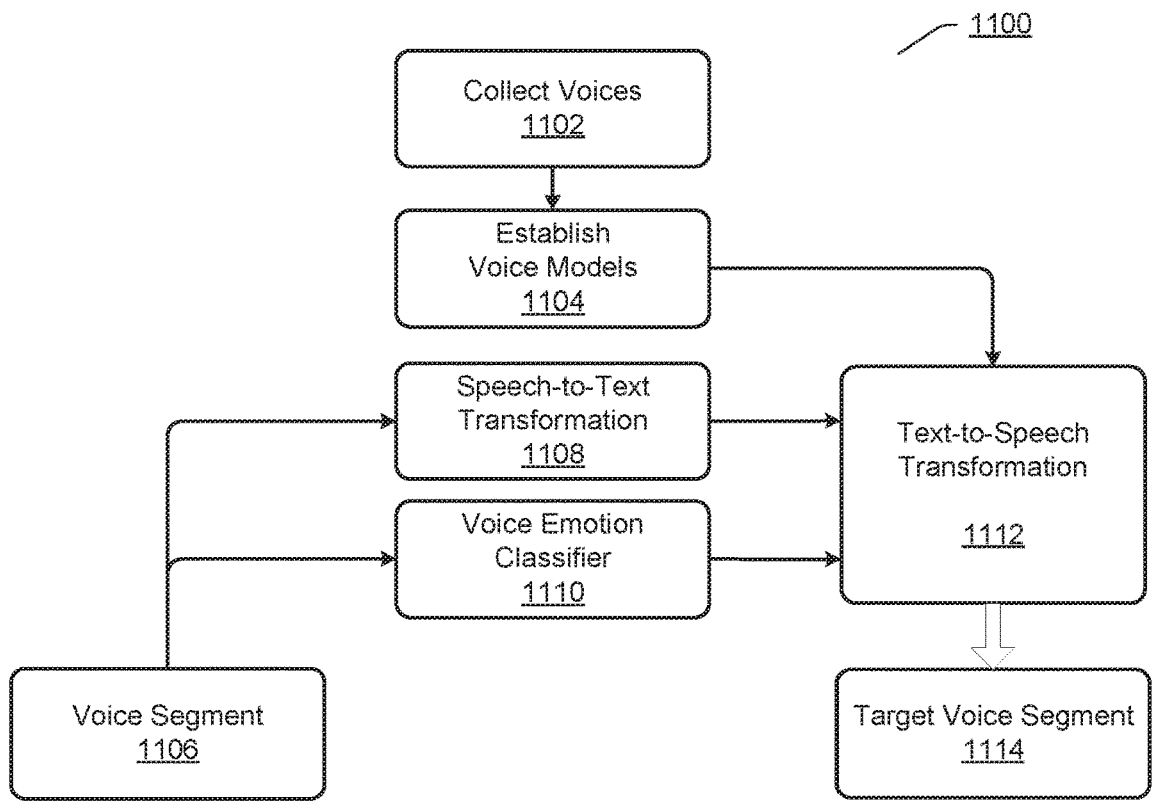
FIG. 11 illustrates an exemplary process for performing voice conversion according to an embodiment.

FIG. 11 illustrates an exemplary process 1100 for performing voice conversion according to an embodiment. The process 1100 may be used for converting a voice segment into a target voice segment. Thus, the chatbot may allow an entity to customize voices by specifying a voice preference.

At 1102, voices may be collected from various media. The collected voices may be of various voice styles, and may be voices of various characters, such as, a man, a women, movie stars, singers, famous public people, etc.

At 1104, voice models may be established based on the collected voices. A voice model for a character may contain various voice parameters, such as, tones, that can characterize the character. The voice models established for various characters may be further used for voice conversion. It should be appreciated that the voice models established at 1104 may also include a voice model of the chatbot itself, such that the voice model of the chatbot may also be used for voice conversion.

At 1106, a voice segment may be obtained from an entity. For example, the voice segment may be received by the chatbot at 508 in FIG. 5 or at 606 in FIG. 6.

At 1108, a speech-to-text transformation may be performed on the voice segment so as to obtain a text corresponding to the voice segment.

In an implementation, the text obtained at 1108 may be provided to a text-to-speech transformation at 1112. Meanwhile, a voice model may be selected from the voice models established at 1104 based on a voice preference of the entity, and provided to the text-to-speech transformation at 1112. For example, the entity may specify the voice preference in a request of transmitting voice, where the voice preference may be, such as, the name of a character, and the chatbot may select and use a voice model corresponding to the voice preference. The text-to-speech transformation may generate a target voice segment 1114 based on the text and the selected voice model. The tones of the target voice segment 1114 would be based on the voice preference. Thus, a tone-level voice conversion may be achieved.

In an implementation, before providing the text obtained at 1108 to the text-to-speech transformation at 1112, the text may be modified based on the voice preference. In some cases, different characters may have special expression words in terms of age, gender, career, speaking habit, etc. For example, in Japanese, if converting a boy's language to a girl's language, a subject of a sentence should be modified from "俺", that is used by a boy for expressing "I", to "あたし", that is used by a girl for expressing "I". Thus, the text obtained at 1108 may be modified if words in the text should be replaced so as to conform to the specified character. Then, the text-to-speech transformation may generate a target voice segment 1114 based on the modified text and the selected voice model. The text and tones of the target voice segment 1114 would be based on the voice preference. Thus, a voice conversion may be achieved in both a text-level and a tone-level.

In an implementation, an emotion of the voice segment may also be considered in the voice conversion. At 1110, a voice emotion classifier may be used for detect the emotion of the voice segment. An emotion model, which is time-sensitive to an input, may be determined based on the detected emotion, and may be further applied on the textto-speech transformation at 1112 to synthesize the target voice segment 1114 which may have the emotion of the voice segment. In this case, the target voice segment may be computed as:

$$\text{Target voice segment} = \text{emotion model} * \text{text-to-speech transformation}$$
$$= \int \text{emotion}(T)\, \text{speech}(t-T)\, dT \quad \text{Equation (10)}$$

where T is a time point ranging over the length of the voice segment, emotion (T) denotes the emotion model, and speech (t–T) denotes the text-to-speech transformation. In an implementation, a Fast Fourier Transform (FFT) with convolutional computing between emotion (T) and speech (t–T) may be applied for the computing of Equation (10).

Figure 12A:
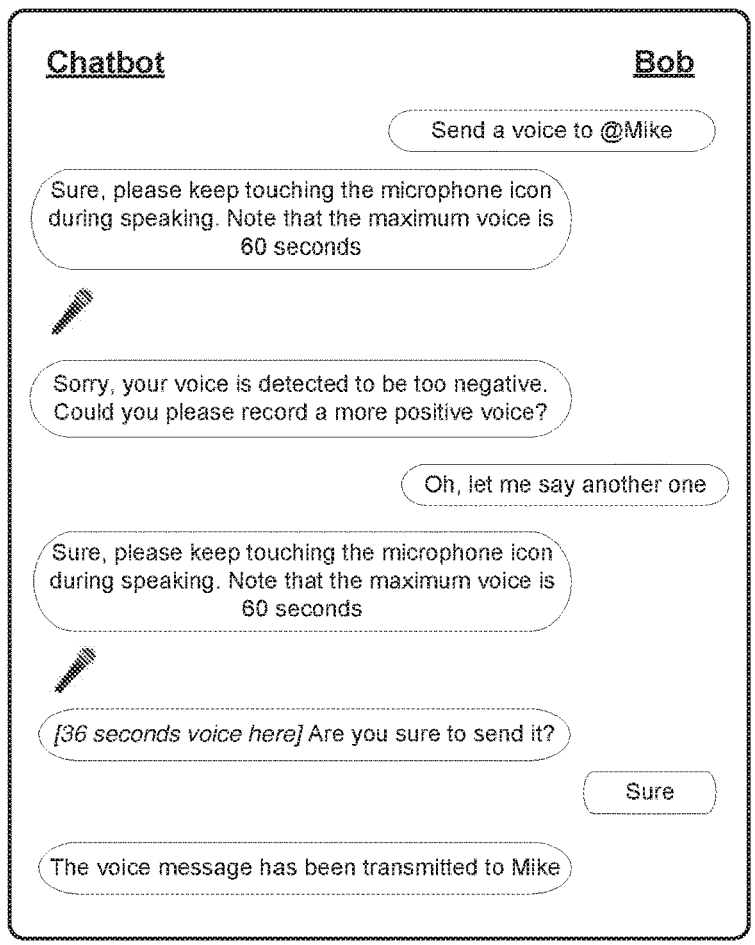
FIG. 12A, FIG. 12B, FIG. 13A, FIG. 13B, FIG. 14A and FIG. 14B illustrate exemplary chat windows for voice forwarding according to an embodiment.

FIG. 12A illustrates an exemplary chat window 1200A for voice forwarding according to an embodiment. The chat window 1200A shows that the chatbot may forward a voice message for an entity "Bob" in a chat flow.

The entity Bob inputs a request "Send a voice to @Mike". The chatbot may determine from the request that Bob desires to transmit a voice message to Mike, and thus may respond by "Sure, please keep touching the microphone icon during speaking. Note that the maximum voice is 60 seconds". When Bob touches and speaks, the chatbot may obtain a voice segment from Bob. The chatbot detects an emotion of the voice segment, and finds that the emotion is negative, e.g., disgusted. Thus, the chatbot may require Bob to input another voice segment by informing "Sorry, your voice is detected to be too negative. Could you please record a more positive voice?". Then, Bob inputs a new voice segment in 36 seconds. The chatbot may receive the new voice segment and determine that the emotion of the new voice segment is not negative. After generating a voice message based on the new voice segment, the chatbot transmits the voice message to Bob and confirm with Bob about whether to transmit the voice message by asking "Are you sure to send it?". Bob responds by "Sure" to confirm to transmit the voice message. After transmitting the voice message, the chatbot may notify Bob that "The voice message has been transmitted to Mike".

Figure 12B:
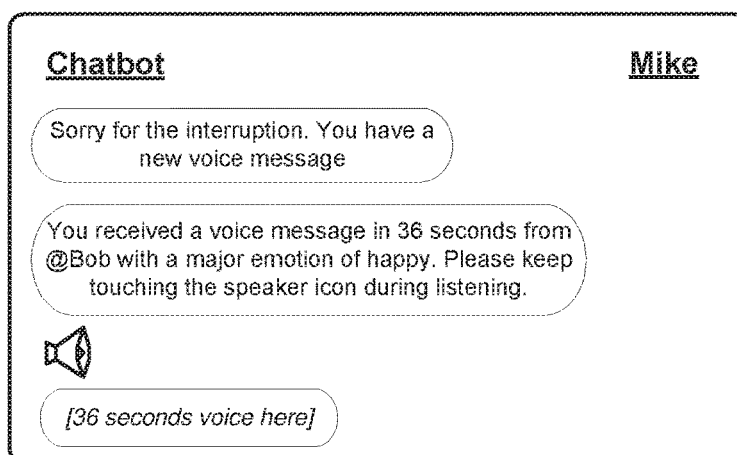

FIG. 12B illustrates an exemplary chat window 1200B for voice forwarding according to an embodiment. The chat window 1200B shows that the chatbot may forward the voice message in FIG. 12A to the entity "Mike" in a chat flow.

The chatbot may transmit to Mike a message notification "You received a voice message in 36 seconds from @Bob with a major emotion of happy. Please keep touching the speaker icon during listening". The message notification includes a length of the voice message, emotion, sender information, guidance for listening, etc. Then, Mike may respond by touching the speaker icon. Thus, the chatbot may transmit the voice message to Mike.

Figure 13A:
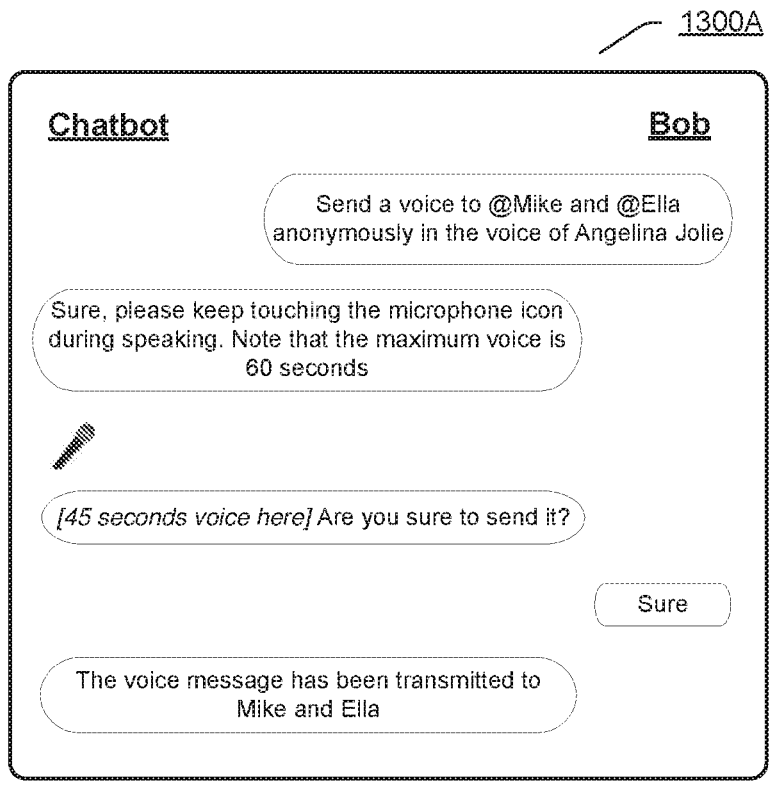

FIG. 13A illustrates an exemplary chat window 1300A for voice forwarding according to an embodiment. The chat window 1300A shows that the chatbot may forward a voice message anonymously and in a specified character's voice for an entity "Bob" in a chat flow.

The entity Bob inputs a request "Send a voice to @Mike and @Ella anonymously in the voice of Angelina Jolie". The chatbot may determine from the request that Bob wants to transmit a voice message to two recipients, and Bob desires to transmit the voice message anonymously and in the voice of Angelina Jolie. After receiving a voice segment from Bob, the chatbot may generate a voice message based on a voice preference of Bob, e.g., in the voice of Angelina Jolie. The chatbot may confirm with Bob about whether to transmit the voice message. When obtaining a confirmation from Bob, the chatbot may transmit the voice message to the recipients, Mike and Ella.

Figure 13B:
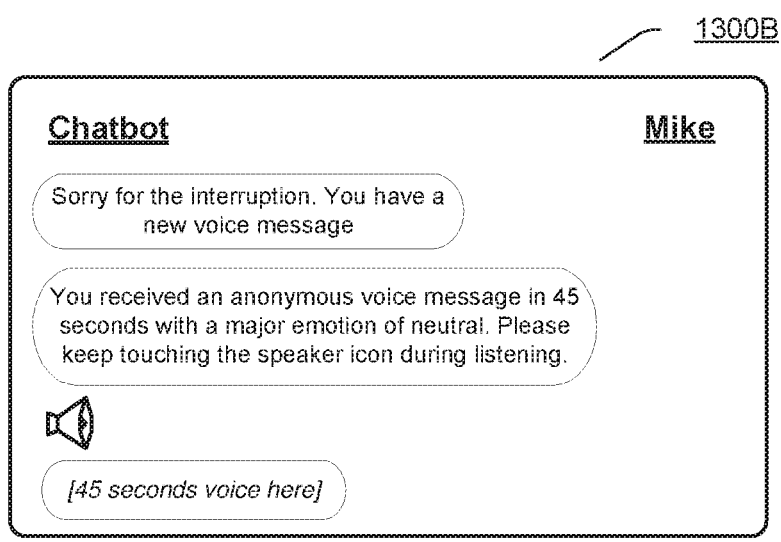

FIG. 13B illustrates an exemplary chat window 1300B for voice forwarding according to an embodiment. The chat window 1300B shows that the chatbot may forward the anonymous voice message in FIG. 13A to the entity "Mike" in a chat flow.

The chatbot may transmit to Mike a message notification "You received an anonymous voice message in 45 seconds with a major emotion of happy. Please keep touching the speaker icon during listening". The message notification includes a length of the voice message, emotion, guidance for listening, etc., but does not include sender information. Then, Mike may respond by touching the speaker icon. Thus, the chatbot may transmit the anonymous voice message to Mike. Mike can listen to the anonymous voice message which is in the voice of Angelina Jolie rather than in the voice of Bob.

It should be appreciated that the chatbot may forward the anonymous voice message to another recipient "Ella" in the same way as shown in FIG. 13B.

Figure 14A:
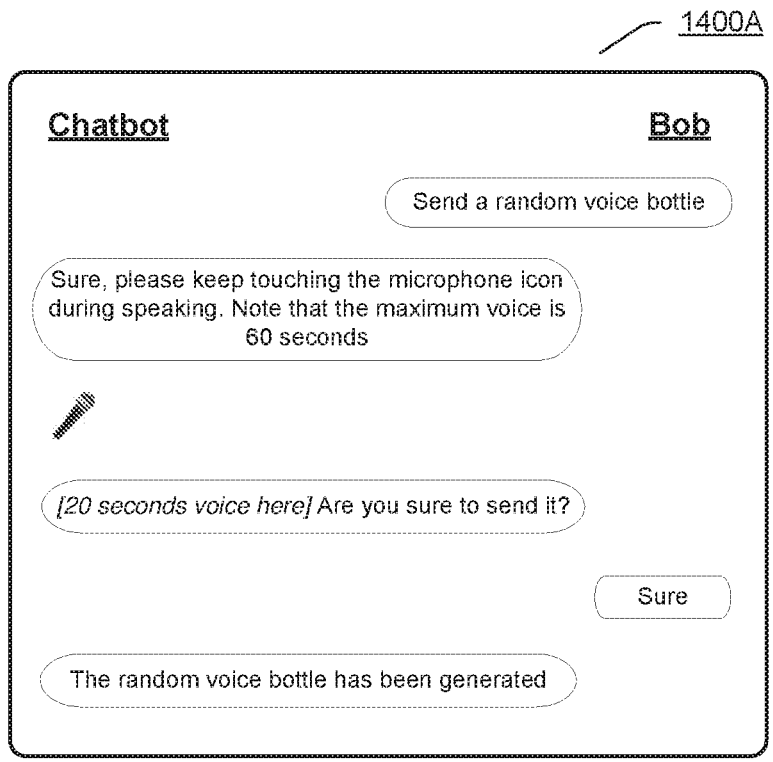

FIG. 14A illustrates an exemplary chat window 1400A for voice forwarding according to an embodiment. The chat window 1400A shows that the chatbot may forward a random voice bottle for an entity "Bob" in a chat flow.

The entity Bob inputs a request "Send a random voice bottle". The chatbot may determine from the request that Bob wants to transmit a random voice bottle. After receiving a voice segment from Bob, the chatbot may generate a random voice bottle based on the voice segment, and store the random voice bottle.

Figure 14B:
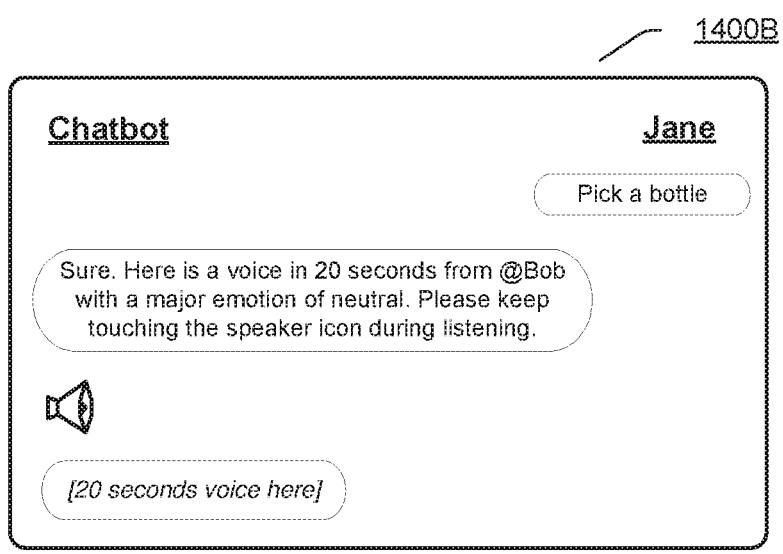

FIG. 14B illustrates an exemplary chat window 1400B for voice forwarding according to an embodiment. The chat window 1400B shows that the chatbot may forward the random voice bottle in FIG. 14A to the entity "Jane" in a chat flow.

The entity Jane inputs a request "Pick a bottle". The chatbot may determine from the request that Jane wants to receive a random voice bottle. The chatbot may retrieve the random voice bottle generated in FIG. 14A, and transmit to Jane a message notification "Sure. Here is a voice in 20 seconds from @Bob with a major emotion of neutral. Please keep touching the speaker icon during listening". Jane may respond by touching the speaker icon, and the chatbot may transmit the random voice bottle to Jane.

It should be appreciated that the chat windows shown in FIG. 12A to FIG. 14B are exemplary, and depending on specific applications and scenarios, the chat windows according to the embodiments of the present disclosure may change in various approaches.

Figure 15:
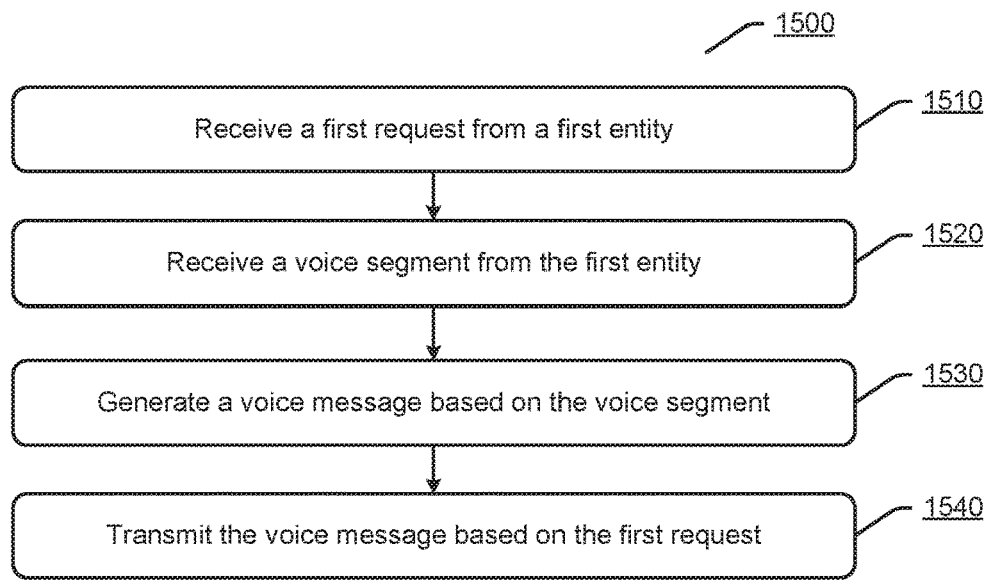
FIG. 15 illustrates a flowchart of an exemplary method for voice forwarding in automated chatting according to an embodiment.

FIG. 15 illustrates a flowchart of an exemplary method 1500 for voice forwarding in automated chatting according to an embodiment.

At 1510, a first request for transmitting a voice segment may be received from a first entity in a service group. The service group may include a plurality of entities.

At 1520, the voice segment may be received from the first entity.

At 1530, a voice message may be generated based on the voice segment.

At 1540, the voice message may be transmitted based on the first request.

In an implementation, the method 1500 may further comprise: determining at least one second entity in the service group based on the first request. The transmitting the voice message may comprise: transmitting the voice message to the at least one second entity.

In an implementation, the method 1500 may further comprise: determining that the first request indicates transmitting the voice segment randomly, e.g., transmitting a random voice bottle; and receiving, from a second entity in the service group, a second request for obtaining a randomly-transmitted voice message. The transmitting the voice message may comprise: transmitting the voice message to the second entity.

In an implementation, the method 1500 may further comprise: determining that the first request indicates transmitting the voice segment in a way not denoting the first entity. The transmitting the voice message may comprise: transmitting the voice message in the way not denoting the first entity. For example, the voice message may be transmitted anonymously.

In an implementation, the generating the voice message may comprise: including the voice segment in the voice message.

In an implementation, the generating the voice message may comprise: detecting an indication of voice preference from the first request; converting the voice segment into a target voice segment based on the voice preference; and including the target voice segment in the voice message.

In an implementation, the converting may comprise: transforming the voice segment into a text; and transforming the text into the target voice segment, tones of the target voice segment being based on the voice preference.

In an implementation, the converting may comprise: transforming the voice segment into a text; modifying the text based on the voice preference; and transforming the modified text into the target voice segment, tones of the target voice segment being based on the voice preference.

In an implementation, the method 1500 may comprise detecting an emotion of the voice segment, and the converting may be further based on the emotion.

In an implementation, the method 1500 may further comprise: transmitting the voice message to the first entity. The transmitting the voice message may comprise: transmitting the voice message if a confirmation of transmitting the voice message is received from the first entity.

In an implementation, the method 1500 may further comprise: detecting an emotion of the voice segment; generating a message notification based at least on the emotion; and transmitting the message notification based on the first request.

In an implementation, the method 1500 may further comprise: detecting an emotion of the voice segment; and forbidding the transmitting of the voice message if the emotion is negative.

In an implementation, the detecting of the emotion may be based on a voice emotion classifier established through deep learning.

In an implementation, the method 1500 may further comprise: stop transmitting the voice message if the voice message has been transmitted for a predetermined number of times.

In an implementation, the voice segment may be limited to a length within a time threshold.

It should be appreciated that the method 1500 may further comprise any steps/processes for voice forwarding in automated chatting according to the embodiments of the present disclosure as mentioned above.

Figure 16:
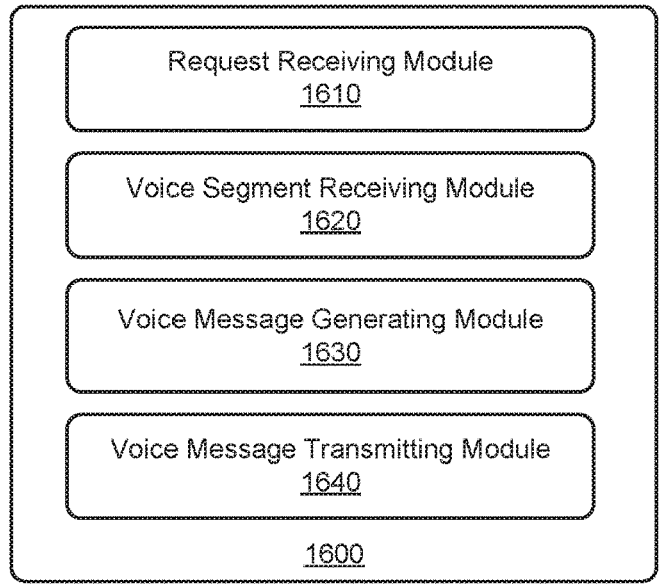
FIG. 16 illustrates an exemplary apparatus for voice forwarding in automated chatting according to an embodiment.

FIG. 16 illustrates an exemplary apparatus 1600 for voice forwarding in automated chatting according to an embodiment.

The apparatus 1600 may comprise: a request receiving module 1610, for receiving, from a first entity in a service group, a first request for transmitting a voice segment; a voice segment receiving module 1620, for receiving the voice segment from the first entity; a voice message generating module 1630, for generating a voice message based on the voice segment; and a voice message transmitting module 1640, for transmitting the voice message based on the first request.

In an implementation, the apparatus 1600 may further comprise: an entity determining module, for determining at least one second entity in the service group based on the first request. The voice message transmitting module 1640 may be further for transmitting the voice message to the at least one second entity.

In an implementation, the apparatus 1600 may further comprise: a random transmission determining module, for determining that the first request indicates transmitting the voice segment randomly. The request receiving module 1610 may be further for receiving, from a second entity in the service group, a second request for obtaining a randomly-transmitted voice message. The voice message transmitting module 1640 may be further for transmitting the voice message to the second entity.

In an implementation, the voice message generating module may be further for: detecting an indication of voice preference from the first request; converting the voice segment into a target voice segment based on the voice preference; and including the target voice segment in the voice message. The apparatus 1600 may further comprise: an emotion detecting module, for detecting an emotion of the voice segment. The converting may be further based on the emotion.

Moreover, the apparatus 1600 may also comprise any other modules configured for performing any operations of the methods for voice forwarding in automated chatting according to the embodiments of the present disclosure as mentioned above.

Figure 17:
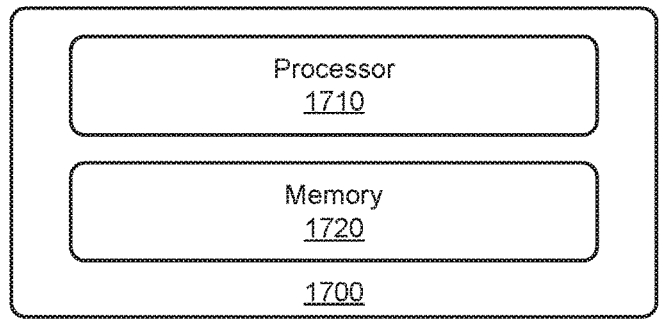
FIG. 17 illustrates an exemplary apparatus for voice forwarding in automated chatting according to an embodiment.

FIG. 17 illustrates an exemplary apparatus 1700 for voice forwarding in automated chatting according to an embodiment.

The apparatus 1700 may comprise a processor 1710. The apparatus 1700 may further comprise a memory 1720 that is connected with the processor 1710. The memory 1720 may store computer-executable instructions that, when executed, cause the processor 1710 to perform any operations of the methods for voice forwarding in automated chatting according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for voice forwarding in automated chatting according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for voice forwarding in a computer implemented chatting service, comprising:
   receiving at the chatting service, from a first entity in a service group, a first request for transmitting a voice segment;
   sending a response via the chatting service to the first entity;
   receiving at the chatting service, the voice segment from the first entity in response to the response sent by the chatting service;
   generating via the chatting service, a voice message based on the voice segment; and
   transmitting via the chatting service, the voice message based on the first request.

2. The method of claim 1, further comprising:
   determining at least one second entity in the service group based on the first request,
   wherein the transmitting the voice message comprises: transmitting the voice message to the at least one second entity.

3. The method of claim 1, further comprising:
   determining that the first request indicates transmitting the voice segment randomly; and
   receiving, from a second entity in the service group, a second request for obtaining a randomly-transmitted voice message,
   wherein the transmitting the voice message comprises: transmitting the voice message to the second entity.

4. The method of claim 1, further comprising:
   determining that the first request indicates transmitting the voice segment in a way not denoting the first entity,
   wherein the transmitting the voice message comprises: transmitting the voice message in the way not denoting the first entity.

5. The method of claim 1, wherein the generating the voice message comprises:
   including the voice segment in the voice message.

6. The method of claim 1, wherein the generating the voice message comprises:
   detecting an indication of target voice preference from the first request;
   converting the received voice segment, via the chatting service, into a target voice segment based on the voice preference such that the target voice segment is in a voice different from the received voice segment; and
   including the target voice segment in the voice message.

7. The method of claim 6, wherein the converting comprises:
   transforming the voice segment into a text; and
   transforming the text into the target voice segment, tones of the target voice segment being based on the voice preference.

8. The method of claim 6, wherein the converting comprises:
   transforming the voice segment into a text;
   modifying the text based on the voice preference; and
   transforming the modified text into the target voice segment, tones of the target voice segment being based on the voice preference.

9. The method of claim 6, further comprising:
   detecting an emotion of the voice segment,
   wherein the converting is further based on the emotion.

10. The method of claim 1, further comprising:
    transmitting the voice message to the first entity,
    wherein the transmitting the voice message comprises: transmitting the voice message if a confirmation of transmitting the voice message is received from the first entity.

11. The method of claim 1, further comprising:
    detecting an emotion of the voice segment;
    generating a message notification based at least on the emotion; and
    transmitting the message notification based on the first request.

12. The method of claim 1, further comprising:
detecting an emotion of the voice segment; and
forbidding the transmitting of the voice message if the emotion is negative.

13. The method of claim 9, wherein
the detecting of the emotion is based on a voice emotion classifier established through deep learning.

14. The method of claim 1, further comprising:
stop transmitting the voice message if the voice message has been transmitted for a predetermined number of times.

15. The method of claim 1, wherein
the voice segment is limited to a length within a time threshold.

16. An apparatus for voice forwarding in a computer implemented chatting service, comprising:
a request receiving module of the chatting service, for receiving, from a first entity in a service group, a first request for transmitting a voice segment;
a voice segment receiving module of the chatting service, for receiving the voice segment from the first entity in response to a response generated by the chatting service;
a voice message generating module of the chatting service, for generating a voice message based on the voice segment; and
a voice message transmitting module of the chatting service, for transmitting the voice message based on the first request.

17. The apparatus of claim 16, further comprising:
an entity determining module, for determining at least one second entity in the service group based on the first request,
wherein the voice message transmitting module is further for: transmitting the voice message to the at least one second entity.

18. The apparatus of claim 16, further comprising:
a random transmission determining module, for determining that the first request indicates transmitting the voice segment randomly,
wherein the request receiving module is further for receiving, from a second entity in the service group, a second request for obtaining a randomly-transmitted voice message,
wherein the voice message transmitting module is further for: transmitting the voice message to the second entity.

19. The apparatus of claim 16, wherein the voice message generating module is further for:
detecting an indication of voice preference from the first request;
converting the voice segment into a target voice segment based on the voice preference; and
including the target voice segment in the voice message.

20. The apparatus of claim 19, further comprising:
an emotion detecting module, for detecting an emotion of the voice segment,
wherein the converting is further based on the emotion.

* * * * *